(12) United States Patent
Parks

(10) Patent No.: US 7,385,638 B2
(45) Date of Patent: Jun. 10, 2008

(54) IMAGE SENSOR FOR STILL OR VIDEO PHOTOGRAPHY

(75) Inventor: Christopher Parks, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 670 days.

(21) Appl. No.: 10/833,917

(22) Filed: Apr. 28, 2004

(65) Prior Publication Data

US 2005/0243195 A1    Nov. 3, 2005

(51) Int. Cl.
    H04N 3/14    (2006.01)
(52) U.S. Cl. ...................................... 348/311; 348/294
(58) Field of Classification Search ............. 348/222.1, 348/311, 294, 350, 351, 345, 248, 318, 319, 348/322, 323, 249; 396/121
    See application file for complete search history.

(56) References Cited

U.S. PATENT DOCUMENTS

| 5,392,070 | A | * | 2/1995 | Endo et al. ................. 348/247 |
| 5,555,023 | A | | 9/1996 | Maenaka et al. |
| 5,668,597 | A | | 9/1997 | Parulski et al. |
| 5,828,406 | A | | 10/1998 | Parulski et al. |
| 5,847,758 | A | * | 12/1998 | Iizuka ........................ 348/317 |
| 5,926,215 | A | * | 7/1999 | Whipple et al. ............. 348/280 |
| 6,169,577 | B1 | * | 1/2001 | Iizuka ........................ 348/317 |
| 6,342,921 | B1 | | 1/2002 | Yamaguchi et al. |
| 6,462,779 | B1 | | 10/2002 | Philbrick |
| 6,661,451 | B1 | * | 12/2003 | Kijima et al. ............. 348/220.1 |
| 6,677,998 | B1 | * | 1/2004 | Misawa ....................... 348/312 |
| 6,897,899 | B1 | * | 5/2005 | Ide et al. ..................... 348/350 |
| 7,148,926 | B2 | * | 12/2006 | Morinaka et al. ........... 348/277 |
| 7,292,274 | B2 | * | 11/2007 | Nakamura .................. 348/272 |
| 2001/0010554 | A1 | | 8/2001 | Yoshida |
| 2002/0135689 | A1 | | 9/2002 | Uya |
| 2003/0020819 | A1 | * | 1/2003 | Fukuda ....................... 348/246 |
| 2003/0067550 | A1 | | 4/2003 | Inokuma et al. |
| 2004/0090535 | A1 | * | 5/2004 | Watanabe ................. 348/222.1 |
| 2006/0044441 | A1 | * | 3/2006 | Parks .......................... 348/322 |
| 2006/0125943 | A1 | * | 6/2006 | Parks .......................... 348/311 |

FOREIGN PATENT DOCUMENTS

| EP | 0 840 503 A2 | 5/1998 |
| EP | 0 936 806 A2 | 8/1999 |
| EP | 0 939 544 A2 | 9/1999 |
| JP | 11275594 A | * 10/1999 |

* cited by examiner

*Primary Examiner*—Lin Ye
*Assistant Examiner*—Amy Hsu
(74) *Attorney, Agent, or Firm*—Peyton Watkins

(57) ABSTRACT

A method for reading out charge from an interlined CCD having a plurality of photo-sensing regions and a plurality of vertical shift registers, and each photosensitive region is mated respectively to a CCD of a vertical shift register and a color filter having a repeating pattern of two rows in which each row includes at least two colors spanning the photo-sensing regions, the method includes reading out one row from each of the two row pattern; summing the same color from each row in the vertical shift register to reduce the resolution by one half; without transferring charge out of the vertical shift register, repeating the reading and summing steps for the remaining row; and reading out the charge in the vertical shift registers in a manner in which different colors are not summed together.

2 Claims, 24 Drawing Sheets field 1 field 2

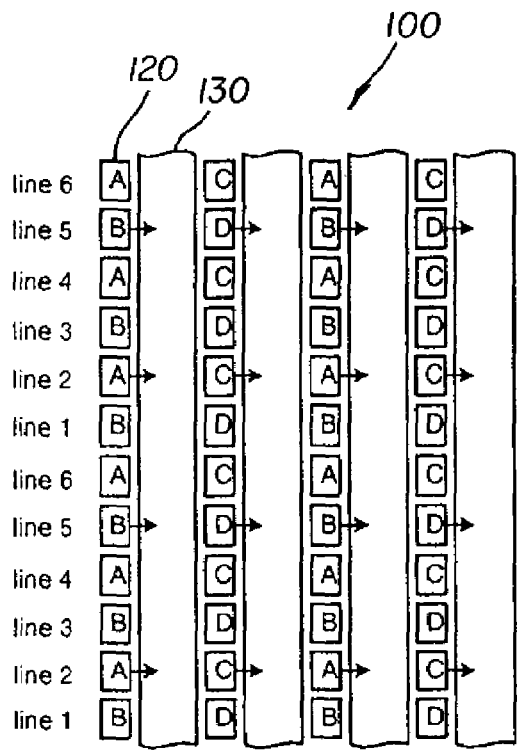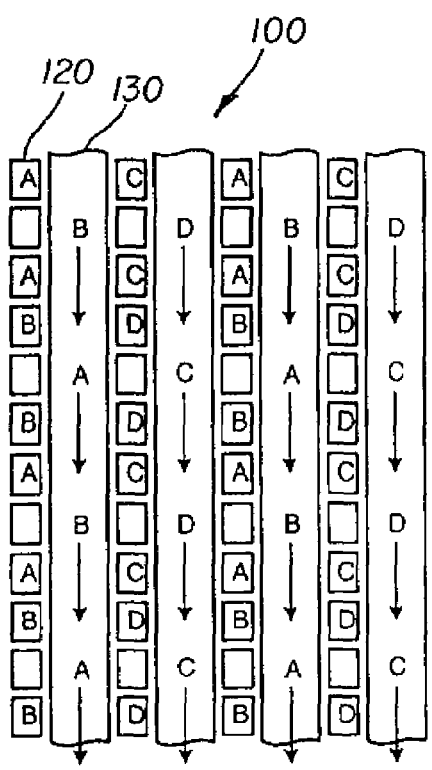
FIG. 9a  FIG. 9b
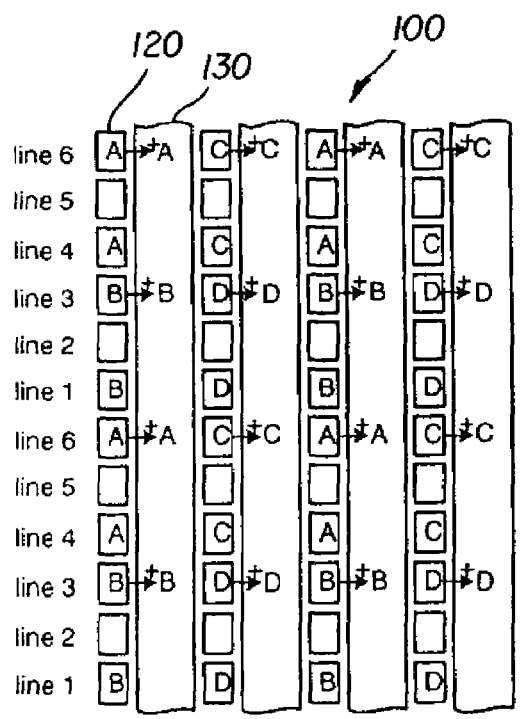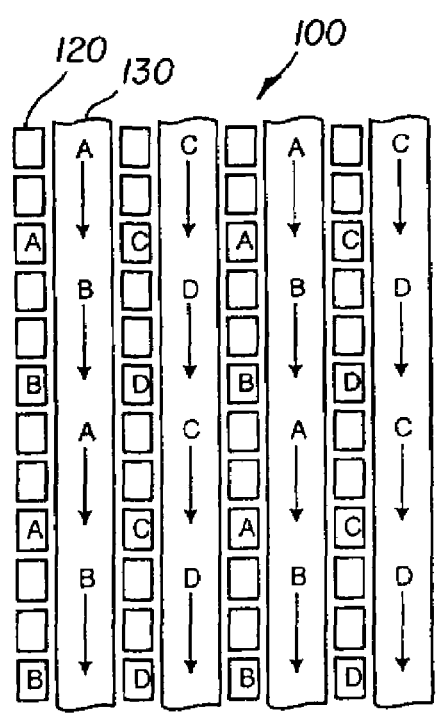
FIG. 9c  FIG. 9d

IMAGE SENSOR FOR STILL OR VIDEO PHOTOGRAPHY

FIELD OF THE INVENTION

The invention relates generally to the field of image sensors and, more particularly, to producing at least 30 frames per second (video) by sampling the entire array of the image sensor and summing all pixel values in a predetermined manner.

BACKGROUND OF THE INVENTION

Referring to FIG. 1, an interline charge coupled device (CCD) image sensor 10 is comprised of an array of photodiodes 20. The photodiodes 20 are covered by color filters to allow only a narrow band of light wavelengths to generate charge in the photodiodes. Referring to FIG. 2, typically image sensors having a pattern of three or more different color filters arranged over the photodiodes in a 2×2 sub array as shown in FIG. 2. For the purpose of a generalized discussion, the 2×2 array is assumed to have four colors, A, B, C, and D. The most common color filter pattern used in digital cameras, often referred to as the Bayer pattern, color A is red, color B and C are green, and color D is blue.

Referring back to FIG. 1, image readout of the photo-generated charge begins with the transfer of some or all of the photodiode charge to the vertical CCD (VCCD) 30. In the case of a progressive scan CCD, every photodiode simultaneously transfers charge to the VCCD 30. In the case of a two field interlaced CCD, first the even numbered photodiode rows transfer charge to the VCCD 30 for first field image readout, then the odd numbered photodiode rows transfer charge to the VCCD 30 for second field image readout.

Charge in the VCCD 30 is read out by transferring all columns in parallel one row at a time into the horizontal CCD (HCCD) 40. The HCCD 40 then serially transfers charge to an output amplifier 50.

FIG. 1 shows an array of only 24 pixels. Many digital cameras for still photography employ image sensors having millions of pixels. A 10-megapixel image sensor would require at least 1/3 second to read out at a 40 MHz data rate. This is not suitable if the same camera is to be used for recording video. A video recorder requires an image read out in 1/30 second. The shortcoming to be addressed by the present invention is how to use an image sensor with more than 1 million pixels as both a high quality digital still camera and 30 frames/second video camera.

The prior art addresses this problem by providing a video image at a reduced resolution (typically 640×480 pixels). For example, an image sensor with 3200×2400 pixels would have only every fifth pixel read out as described in U.S. Pat. No. 6,342,921. This is often referred to as sub-sampling, or sometimes as thinned out mode or skipping mode. The disadvantage of sub-sampling the image by a factor of 5 is only 4% of the photodiodes are used. A sub-sampled image suffers from reduced photosensitivity and alias artifacts. If a sharp line focused on the image sensor is only on the un-sampled pixels, the line will not be reproduced in the video image. Other sub-sampling schemes are described in U.S. Pat. Nos. 5,668,597 and 5,828,406.

Prior art including U.S. Pat. No. 6,661,451 or U.S. patent application publication 2002/0135689 A1 attempt to resolve the problems of sub-sampling by summing pixels together. However, this prior art still leaves some pixels un-sampled. US patent application publication 2001/0010554 A1 increases the frame rate by summing pixels together without sub-sampling. However, it requires a two field interlaced read out. It is more desirable to obtain a video image with progressive scan read out. Interlaced video acquires the two fields at different times. A moving object in the image will appear in different locations when each interlaced field is acquired.

Another disadvantage of the prior art is it only reduces the image resolution in the vertical direction. In the horizontal direction, the HCCD must still read out every pixel. Only reducing the image resolution through sub-sampling or other methods in the vertical direction does not increase the frame rate to 30 frames/second for very large (greater than 8 million pixels) image sensors.

US patent application publication 2003/0067550 A1 reduces the image resolution vertically and horizontally for even faster image readout. However, this prior art requires a striped color filter pattern (a 3×1 color filter array), which is generally acknowledged to be inferior to the Bayer or 2×2 color filter array patterns.

If view of the deficiencies of the prior art, an invention is desired which is able to produce 30 frames/second video from a megapixel image sensor with a 2×2 color filter pattern while sampling 100% of the pixel array and reading out the video image progressive scan (non-interlaced).

SUMMARY OF THE INVENTION

The present invention is directed to overcoming one or more of the problems set forth above. Briefly summarized, according to one aspect of the present invention, the invention resides in a method for reading out charge from an interlined CCD having a plurality of photo-sensing regions and a plurality of vertical shift registers, and each photo-sensitive region is mated respectively to a CCD of a vertical shift register and a color filter having a repeating pattern of two rows in which each row includes at least two colors spanning the photo-sensing regions, the method comprising (a) reading out one row from each of the two-row pattern; (b) summing the same color from each row in the vertical shift register to reduce the resolution by one half, (c) without transferring charge out of the vertical shift register, repeating step (a) and (b) for the remaining row; and (d) reading out the charge in the vertical shift registers in a manner in which different colors are not summed together.

Advantageous Effect of the Invention

The present invention includes the advantage of producing 30 frames per second for video while sampling the entire pixel array.

BRIEF DESCRIPTION OF THE DRAWINGS

FIGS. 9a-9f is still further an alternative embodiment of the present invention;

DETAILED DESCRIPTION OF THE INVENTION

Figure 3A:
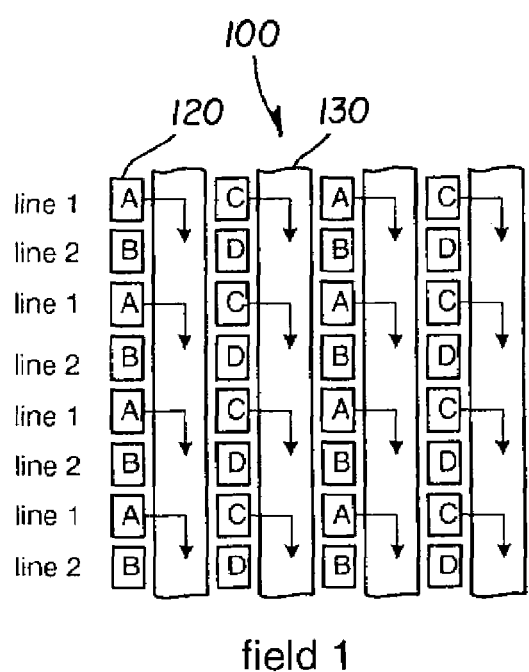
FIGS. 3a and 3b are diagrams illustrating flow of charge in image sensors of the present invention.
Figure 3B:
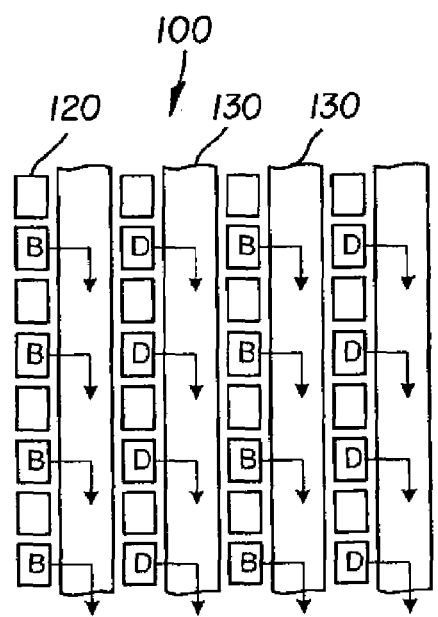

Referring to FIGS. 3a and 3b, there is shown the image sensor 100 of the present invention. For clarity, only a small portion of the pixel array of the image sensor 100 is shown. It consists of an array of photodiodes 120 with VCCDs 130 positioned in between columns of photodiodes 120. There are color filters repeated in a 2×2 array spanning across the entire photodiode array. The 4 color filters A, B, C, and D are of 3 or 4 unique colors. The colors typically are, but not limited to, A=red, B=C=green, D=blue. Other common color schemes utilize cyan, magenta, and yellow or even white filters.

Figure 4:
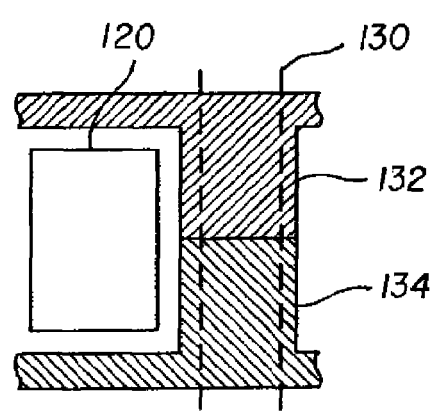
FIG. 4 is a detailed view of a pixel including the VCCD.

Referring briefly to FIG. 4, one pixel is shown. The VCCD 130 is of the interlaced 4-phase type with two control gate electrodes 132 and 134 per photodiode 120.

Referring back to FIG. 3a, the full resolution read out of an image stored in the photodiodes 120 proceeds in the below-described manner for an interlaced image sensor 100. First the charge in field 1, consisting of all lines labeled as line 1, is transferred from the photodiodes 120 to the adjacent VCCD 130. The VCCD 130 will only receive charge from lines containing colors A and C. Once charge is in the VCCD 130, it is transferred in parallel towards a serial HCCD (not shown) and then towards and output amplifier (not shown), as is well known in the art. Next in FIG. 3b, after all signal from colors A and C have been transferred out of the VCCD 130, the remaining charge in the photodiodes 120 in line 2 is transferred into the VCCD 130. This is field 2 containing only colors B and D. Since the image is read out in two fields, an external shutter is used to block light and prevent further accumulation of signal in the second field while the first field is being read out.

When the sensor is installed in a digital camera and is to be used in video mode, the external shutter is held open and the image sensor 100 is operated continuously. Most applications define video as a frame rate of at least 10 frames/sec with 30 frames/sec being the most desired rate. Currently, image sensors are typically of such high resolution that full resolution image readout at 30 frames/sec is not possible at data rates less than 50 MHz and one or two output amplifiers. The solution of the present invention is to sum together pixels inside the image sensor to reduce the number of pixels down to a resolution allowing video rate imaging.

Figure 5A:
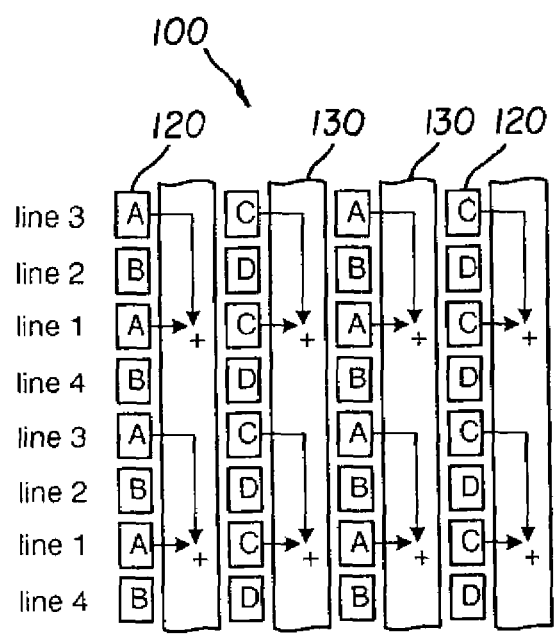
FIGS. 5a-5c are diagrams of an alternative embodiment of the flow of charge in image sensors of the present invention.
Figure 5B:
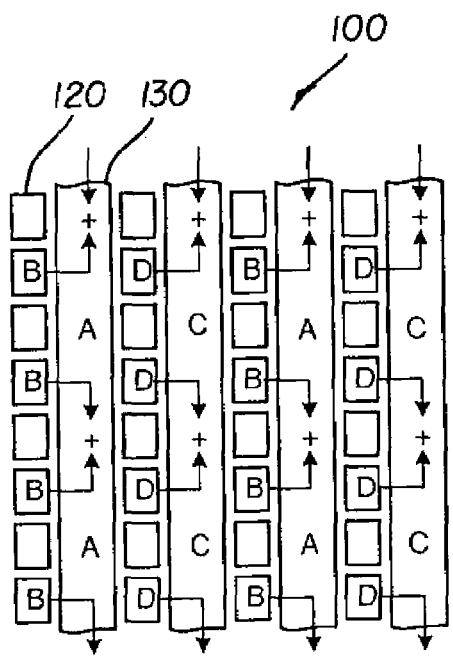
Figure 5C:
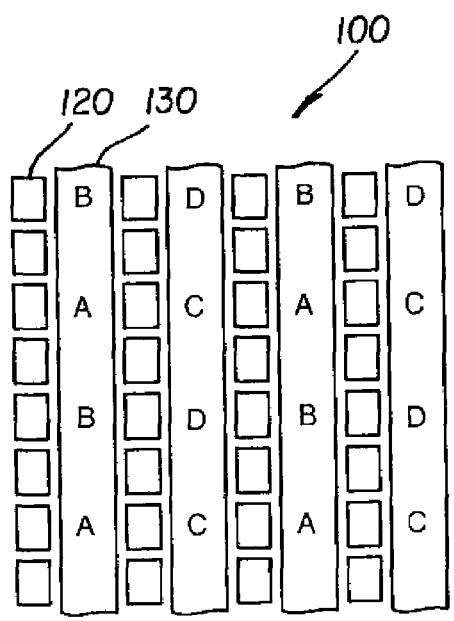

First, the case where frame rate is increased by reducing the vertical resolution by half is discussed. Referring now to FIG. 5a, this is the same image sensor 100 that was shown in FIGS. 3a and 3b with a different read out sequence. First, charge from the photodiodes 120 in line 1 and line 3 are transferred into the VCCD 130 and the VCCD 130 is clocked such that the two charge packets from lines 1 and 3 are summed together in the VCCD 130. Now the image sensor 100 will be in the state shown in FIG. 5b. Two rows of colors A and C have been summed together and are held in the VCCD 130. Next the remaining lines 2 and 4 are transferred from the photodiodes 120 to the VCCD 130. Those two lines are then summed together without mixing together with the summed charge packets of lines 1 and 3. Now the image sensor 100 will be in the state shown in FIG. 5c. All photodiodes 120 have been read out with two rows summed together. The charge packets corresponding to the colors A, B, C, and D are in the VCCD 130 with the original 2×2 color filter pattern arrangement maintained at half the vertical resolution. Now only one field needs to be transferred out of the VCCD thus increasing the frame rate. The sequence of FIGS. 5a-5c are preferably under conditions where the exposure time is long relative to the time required to sum the pixels together in the VCCD 130. If the camera is used outside in bright sunlight, the summing of pixels will enhance the sensitivity such that a very short exposure time will be required. The exposure time might be as short as 100 to 200 μs. The photodiodes 120 from color A are transferred to the VCCD 130 before photodiodes 120 from color B. This time difference is a significant time, about 40 μs. The color B photodiodes 120 will receive a longer exposure time than the photodiodes 120 from color A. Thus, video recording with very short exposure times will show an undesirable color hue shift.

Figure 6A:
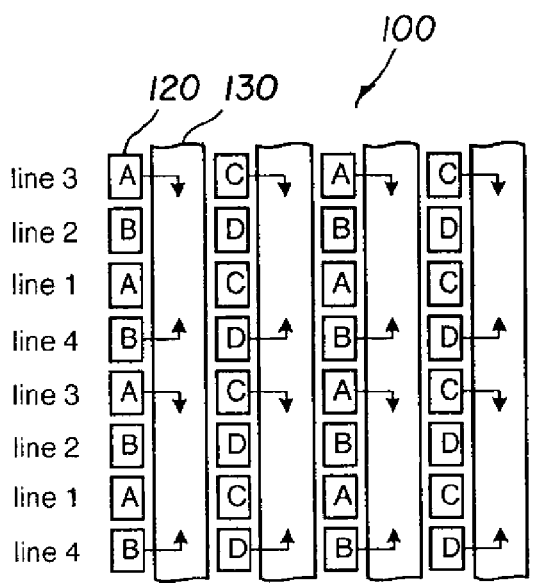
FIGS. 6a-6d are an alternative embodiment of the flow of charge in the image sensors of the present invention.

The short exposure color hue shift can be avoided by always transferring charge from photodiodes 120 of all colors simultaneously to the VCCD 130. This is shown in FIG. 6a. Photodiodes 120 in lines 3 and 4 are transferred simultaneously to the VCCD 130. Since all colors are transferred at the same time, there will be no hue shift for very short exposure. Charge remains in the photodiodes of lines 1 and 2.

Figure 6B:
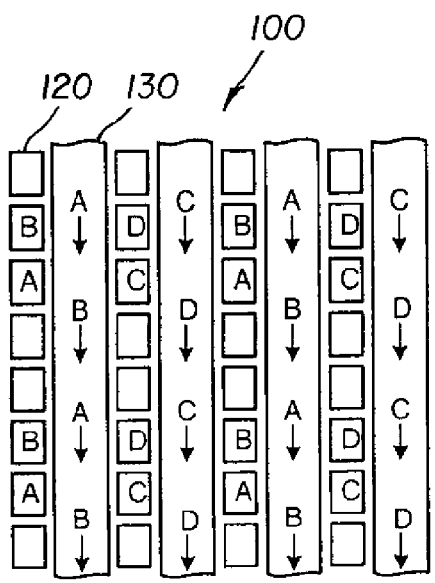
Figure 6C:
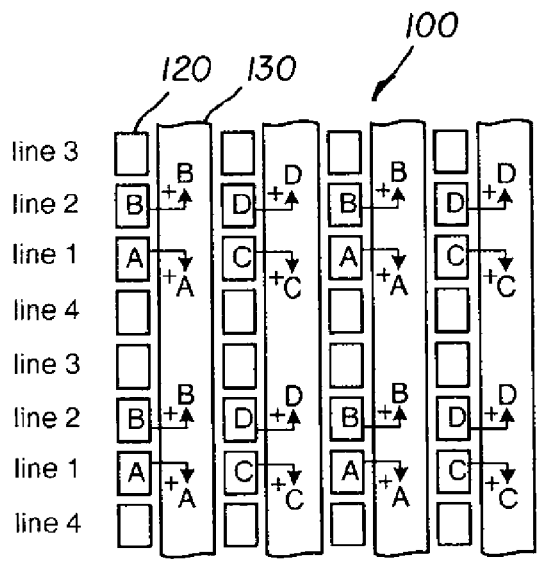
Figure 6D:
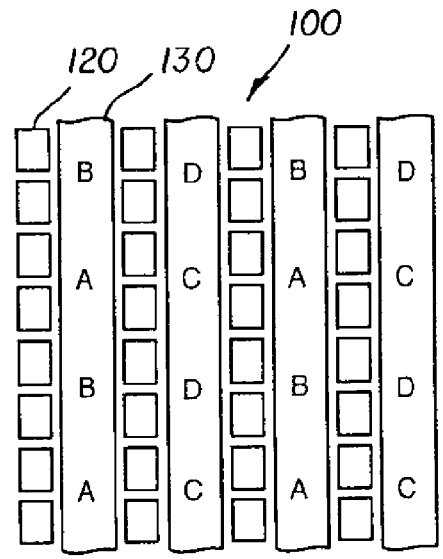

Referring to FIG. 6b, the charge packets in the VCCD 130 are shifted down two lines to bring them into proper alignment to receive charge from the same colors in lines 1 and 2. In FIG. 6c, charge from photodiodes 120 of lines 1 and 2 are transferred and summed with the same colors already present in the VCCD 130. Now in FIG. 6d, the final state of the VCCD 130 after charge summing contains the 2×2 color filter pattern of the original photodiode array with the vertical resolution decreased by half. The charge packets in the VCCD 130 are transferred out of the imager as a single field progressive scan image. The progressive scan image eliminates problems with interlaced field separation. This read out method also samples every pixel in the image for maximum photosensitivity and minimal moiré artifacts and minimal color alias.

Figure 7:
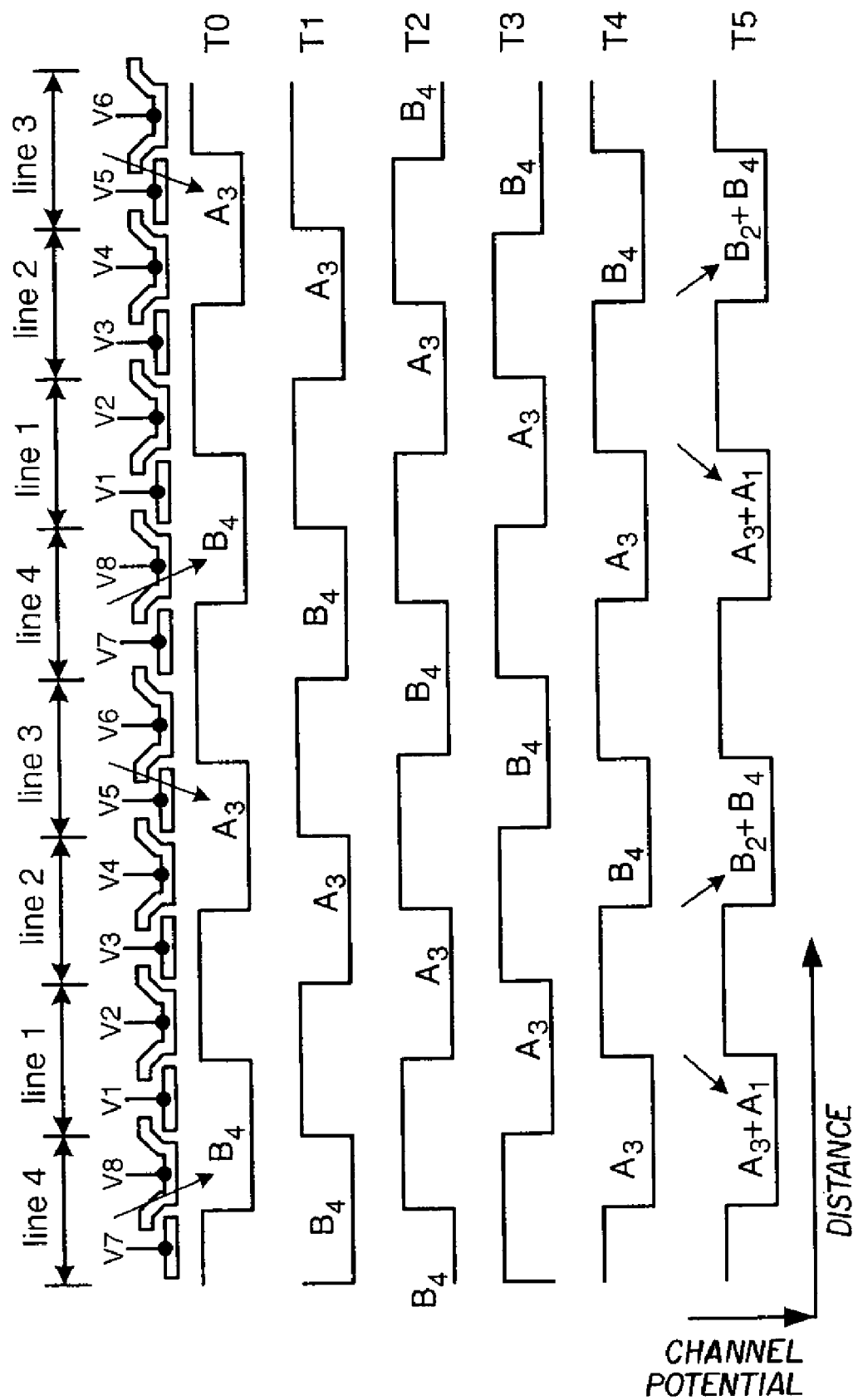
FIG. 7 is a side view of FIGS. 6a-6d including the associated diagrams of clocking of the charge in the channels.
Figure 8:
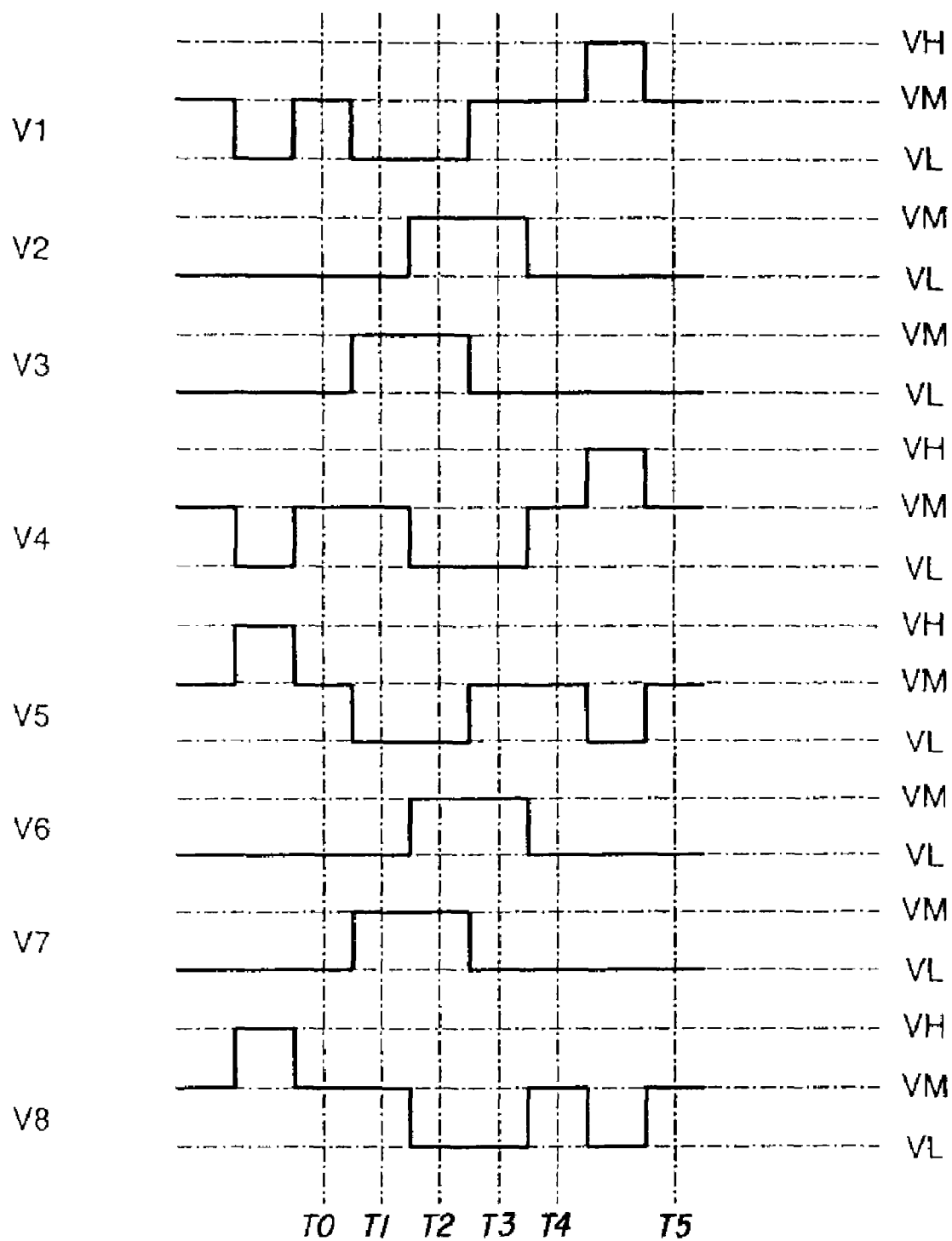
FIG. 8 is a timing diagram of FIG. 7.

Referring to FIG. 7., the details of the clocking of charge packets are shown. FIG. 7 is a cross section down the center of the VCCD 130 of the column containing pixels of colors A and B. The labels A or B and a numerical subscript identify the charge packets. The Letter identifies which color photodiode the charge packet originated from. The subscript identifies which photodiode line the charge packet originated from. The labels T0 through T5 mark the time steps of the charge transfer clocking sequence in FIG. 8. The gates in FIG. 7 are wired to 8 control voltages V1 through V8. The voltages applied to each of the gates at each time step is shown in FIG. 8. The voltage on a gate is one of three levels: VL is the lowest level creating a barrier in the VCCD channel potential (the off state), VM is the middle level creating a well in the VCCD channel potential (the on state), VH is the high level which turns on the transfer channel between the photodiodes and VCCD.

The clocking sequence begins in FIG. 8 by turning on the photodiode transfer channel under gates V5 and V8 of FIG. 7. This puts charge packets $A_3$ and $B_4$ into the VCCD. This is indicated at time step T0 of FIG. 7. The gate voltages are changed according to FIG. 8 from time steps T1 through T4 to advance the charge packets by 4 gates (two lines). Then the photodiode transfer channel under gates V1 and V4 are turned on to add charge packets $A_1$ and $B_2$ to charge packets $A_3$ and $B_4$. After time step T5 the VCCD is clocked with the well-known standard 4-phase CCD timing sequence. Since the number of lines is reduced by half, the frame rate for the image sensor doubles. FIG. 8 does not represent the only possible timing diagram, those skilled in the art can produce many small variations to produce the same charge summing result.

Sometimes a factor of two-speed increase is not sufficient. Also, a video image is desired to be 480 lines. An image sensor with 1440 lines must be reduced by a factor of three.

Figure 9E:
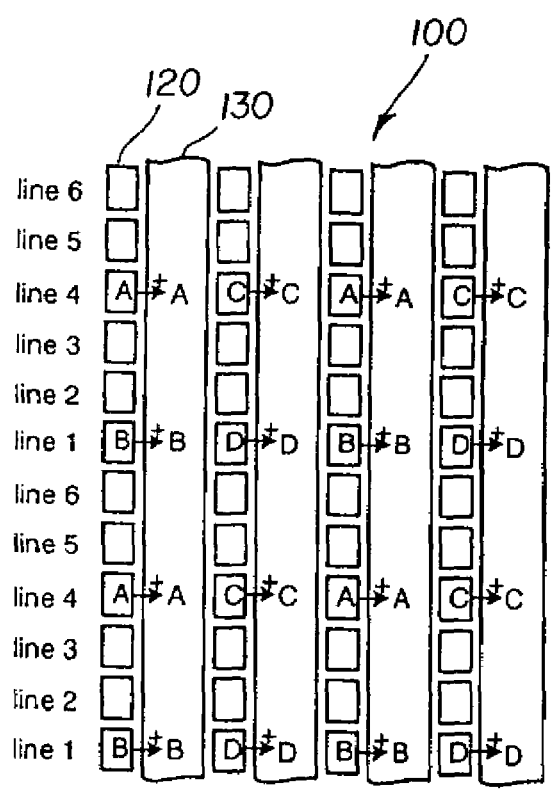
Figure 9F:
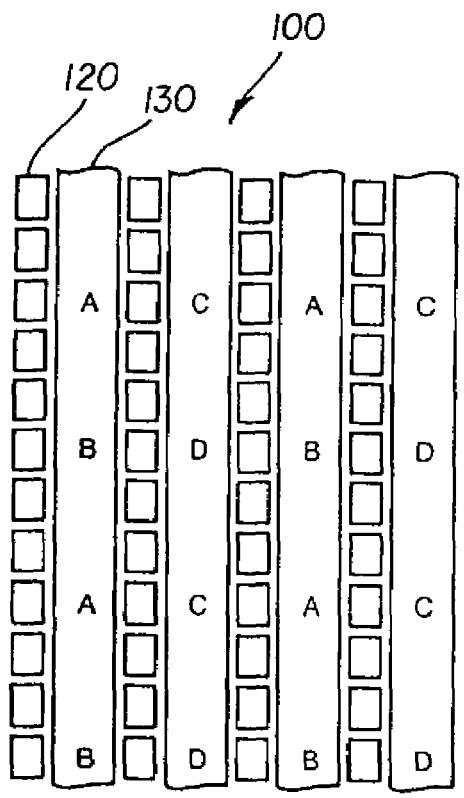

Next, the VCCD clocking sequence for reducing the number of lines by a factor of three is discussed. Referring to FIG. 9a, charge in the photodiodes 120 of lines 2 and 5 only are transferred to the VCCD 130. Then in FIG. 9b, the VCCD 130 transfers charge by two lines to align the charge packets from lines 2 and 5 with lines 3 and 6. In FIG. 9c, the charge from the photodiodes 120 in lines 3 and 6 is transferred and added on top of the charge packets already in the VCCD 130. In FIG. 9d, the summed charge packets are transferred another two lines to align them with lines 1 and 4. Now in FIG. 9e, the last remaining photodiode charge in lines 1 and 4 are transferred and added on top of the charge packets already in the VCCD 130. After the final photodiode transfer in FIG. 9f, there is the 2×2 color filter pattern in the VCCD 130 with one-third the number of lines as the original full resolution image.

Note that in the sequence of FIGS. 9a-9f, every time there is a photodiode to VCCD transfer, all four colors of the 2×2 color filter pattern were transferred to the VCCD 130 simultaneously.

Figure 10:
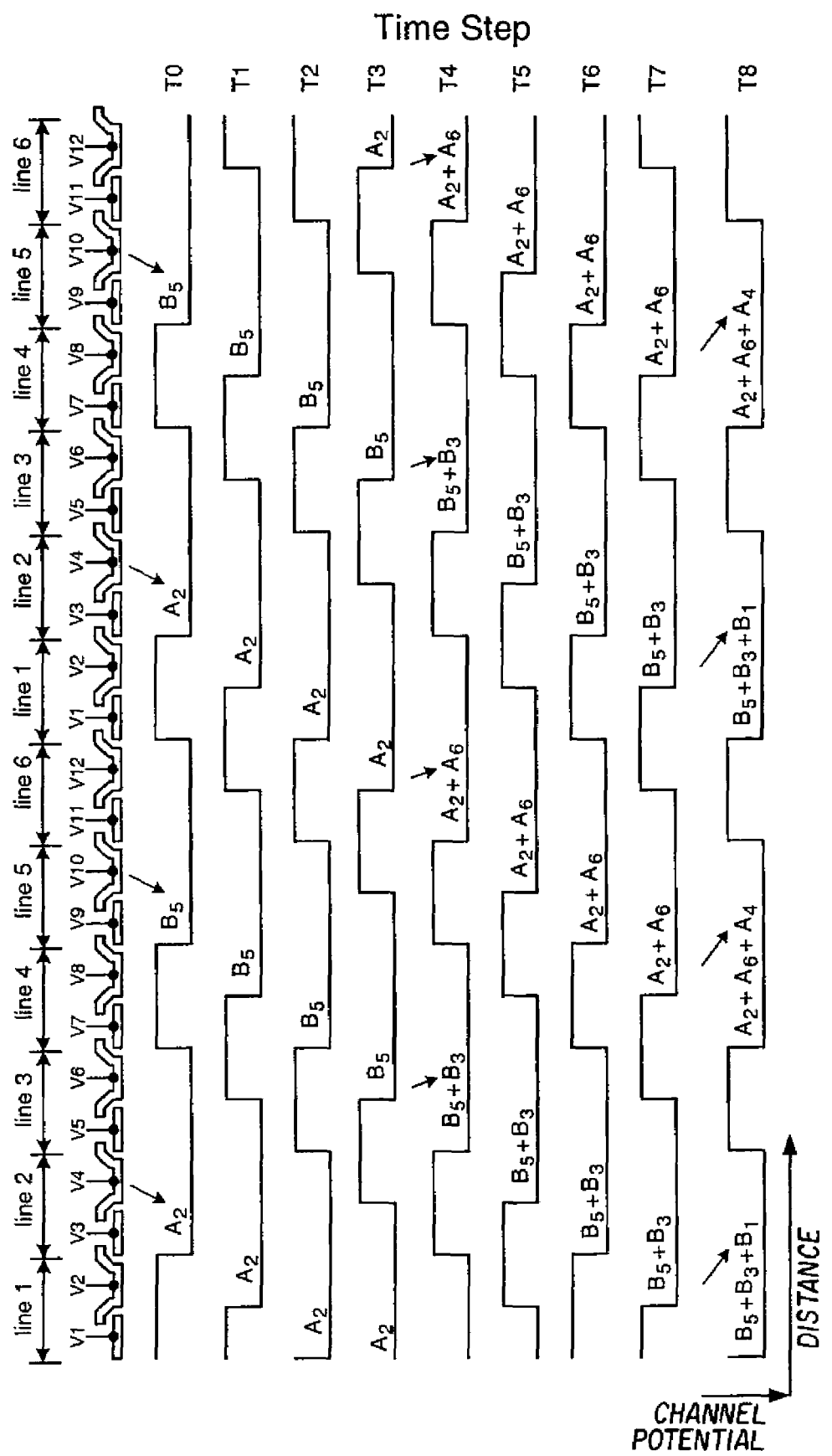
FIG. 10 is a side view of FIGS. 9a-9f including the clocking of charge in the channel.
Figure 11:
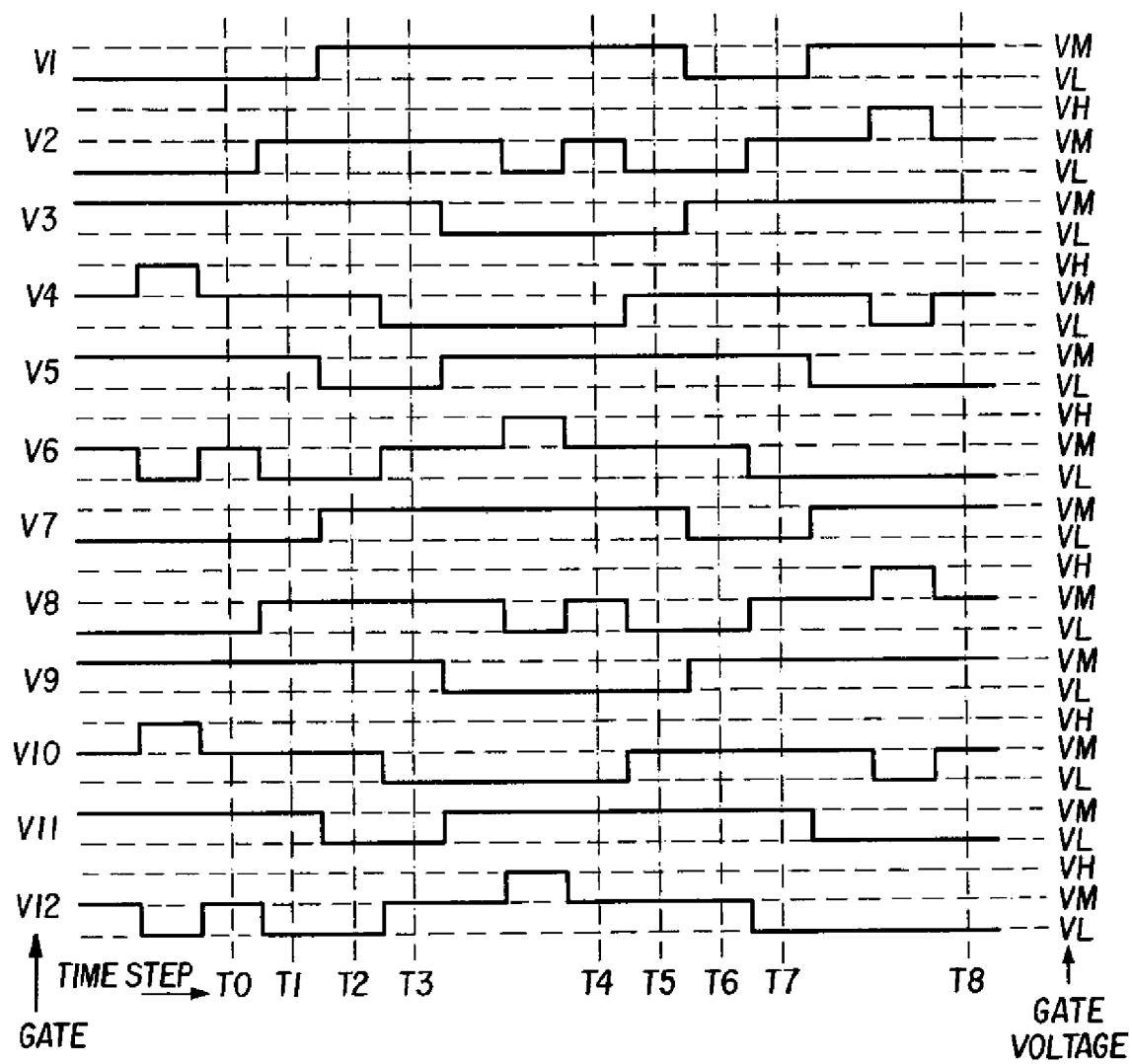
FIG. 11 is a timing diagram of FIG. 10.

FIG. 10 details the clocking of charge packets for reducing the number of lines by a factor of three. FIG. 10 is a cross section down the center of the VCCD of the column containing pixels of colors A and B. The labels A or B and a numerical subscript identify the charge packets. The Letter identifies witch color photodiode the charge packet originated from. The subscript identifies witch photodiode line the charge packet originated from. The labels T0 through T8 mark the time steps of the charge transfer clocking sequence in FIG. 11. The gates in FIG. 10 are wired to 12 control voltages V1 through V12. The voltages applied to the gates at each time step are shown in FIG. 11. The VCCD will be clocked as a 6-phase CCD with four gates normally on and two gates normally off.

The clocking sequence begins in FIG. 11 by turning on the photodiode transfer channel under gates V4 and V10 of FIG. 10. This puts charge packets $A_2$ and $B_5$ into the VCCD. This is indicated at time step T0 of FIG. 10. The gate voltages are changed according to FIG. 11 with 6-phase CCD timing from time steps T1 through T4 to advance the charge packets by 4 gates (two lines). Then the photodiode transfer channel under gates V6 and V12 are turned on to add charge packets $A_6$ and $B_3$ to charge packets $A_2$ and $B_5$. From time step T4 to T8 the VCCD is clocked to advance the charge packets another 4 gates. This aligns the charge packets with the photodiodes in lines 1 and 4. The photodiode transfer channel under gates V2 and V8 are turned on to add charge packets B1 and A4 to the charge packets already in the VCCD. After time step T8 all of the photodiodes have be read out and the image is in the VCCD with one third the number of lines. It is read out of the VCCD by using 6-phase CCD clocking. FIG. 11 does not represent the only possible timing diagram, those skilled in the art can produce many small variations to produce the same charge summing result.

Figure 12A:
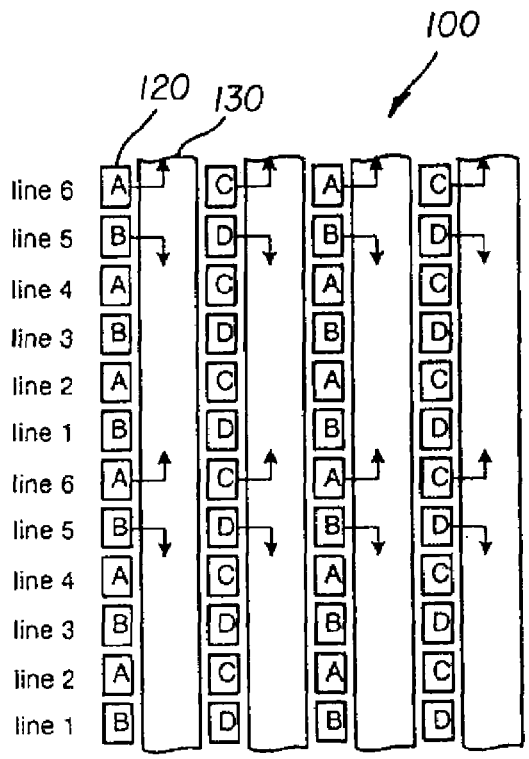
FIGS. 12a-12f are another alternative embodiment of the present invention.
Figure 12B:
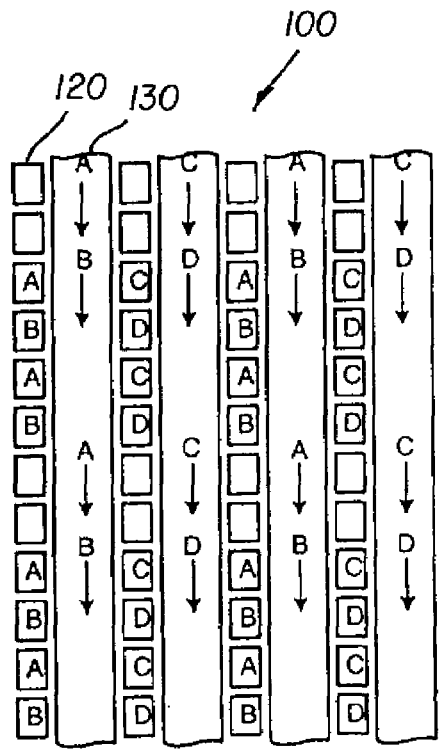
Figure 12C:
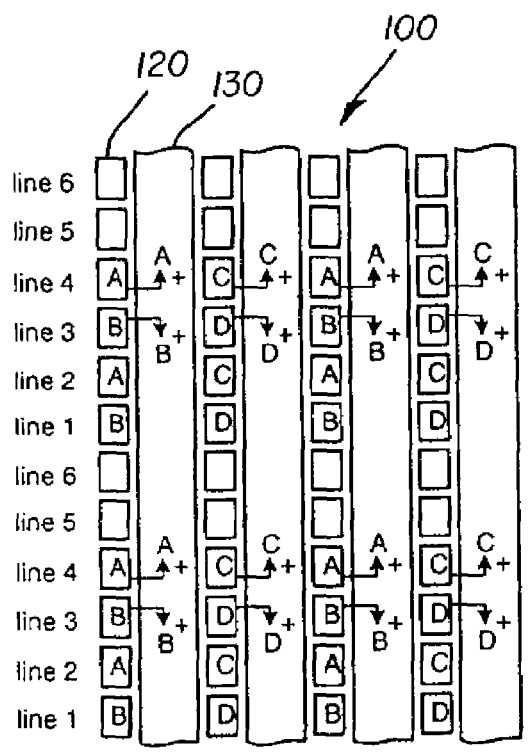
Figure 12D:
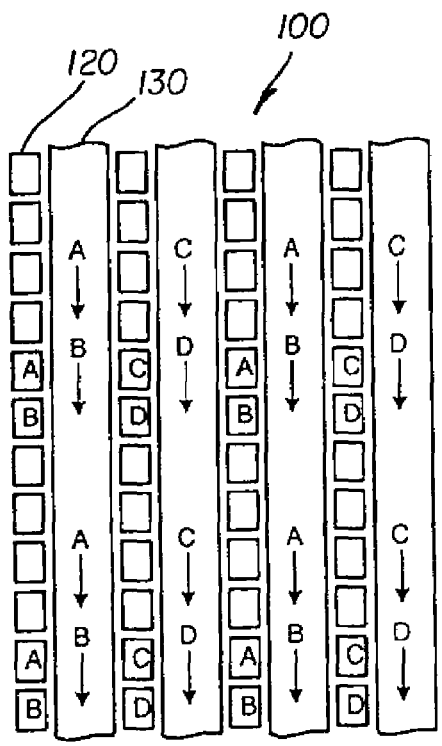
Figure 12E:
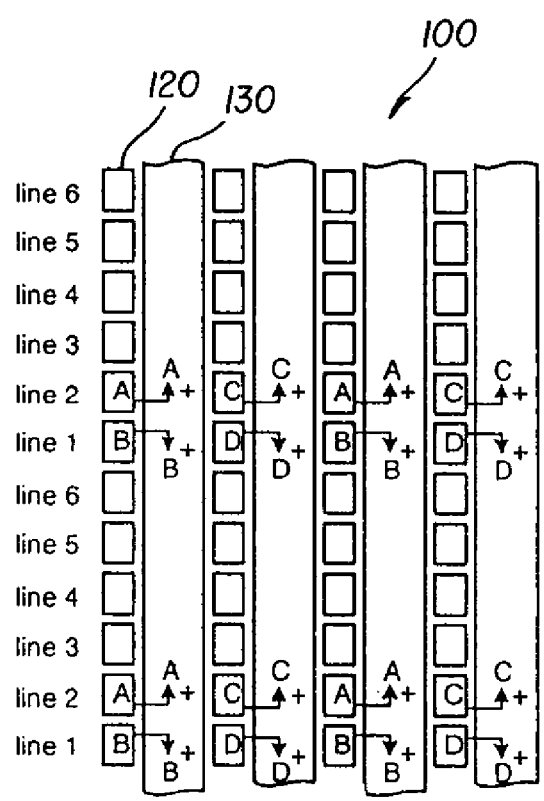
Figure 12F:
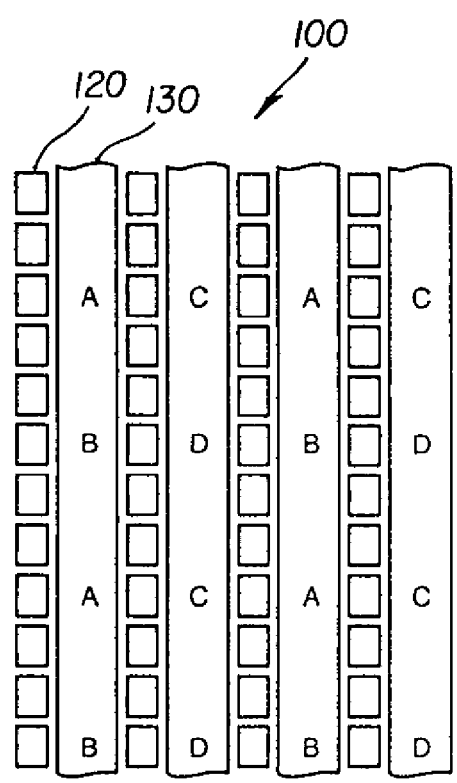

FIGS. 12a-12f show alternative charge transfer sequences for summing together three lines. Referring to FIG. 12a, charge in the photodiodes 120 of lines 5 and 6 only are transferred to the VCCD 130. Then in FIG. 12b, the VCCD 130 transfers charge by two lines to align the charge packets from lines 5 and 6 with lines 3 and 4. In FIG. 12c, the charge from the photodiodes 120 in lines 3 and 4 are transferred and added on top of the charge packets already in the VCCD 130. In FIG. 12d, the summed charge packets are transferred another two lines to align them with lines 1 and 2. Now in FIG. 12e, the last remaining photodiode charge in lines 1 and 2 are transferred and added on top of the charge packets already in the VCCD 130. After the final photodiode transfer in FIG. 12f, there is the 2×2 color filter pattern in the VCCD 130 with one-third the number of lines as the original full resolution image.

Note that in the sequence of FIGS. 12a- 12f, every time there is a photodiode to VCCD transfer, all four colors of the 2×2 color filter pattern were transferred to the VCCD 130 simultaneously.

Figure 13:
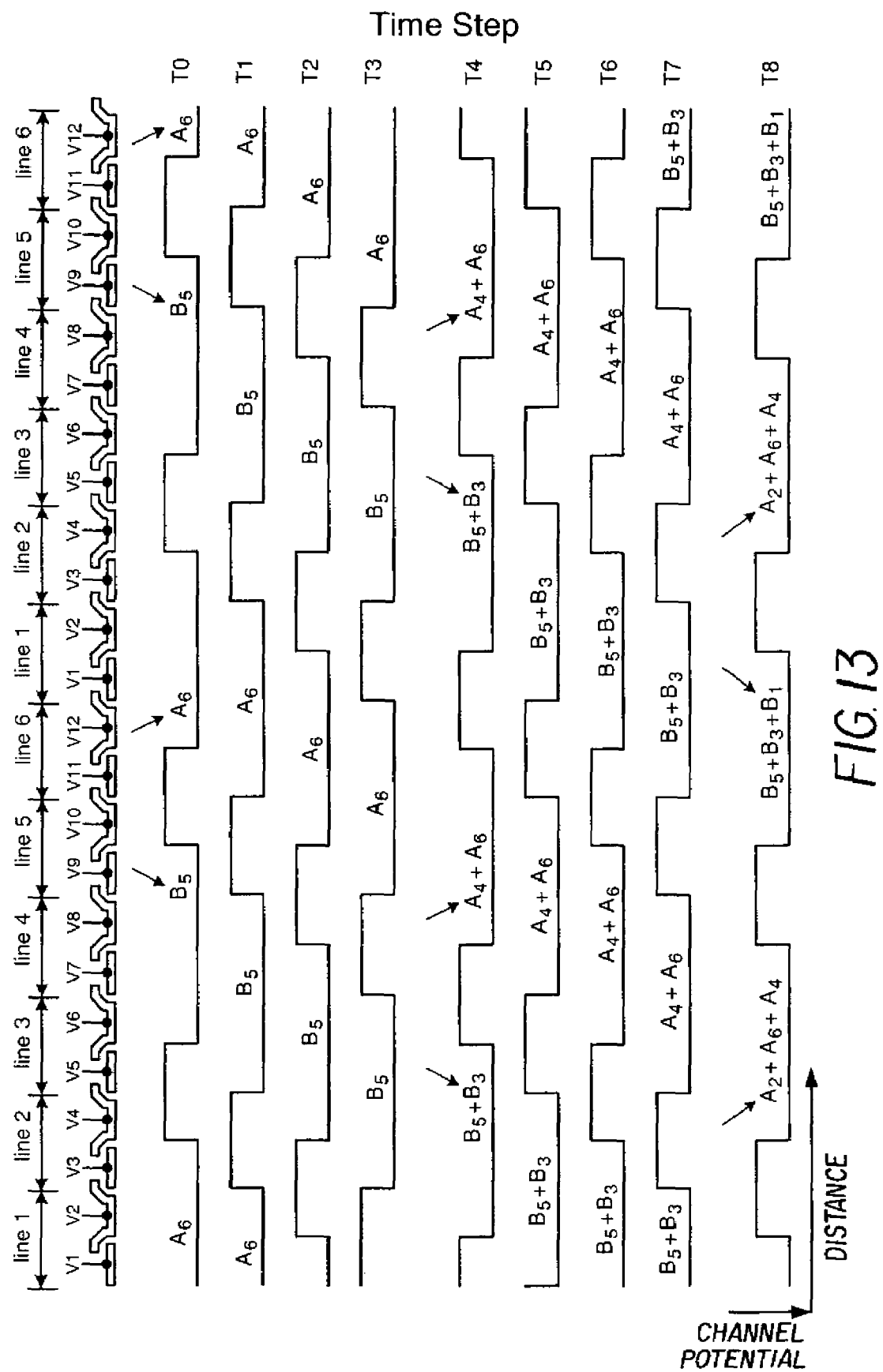
FIG. 13 is a side view of FIGS. 12a-12f including the clocking of charge in the channel.

Referring to FIG. 13, the detail for the charge transfer sequence of FIGS. 12a-12f is shown. At time step T0 in FIG. 13, the photodiode to VCCD transfer channel under gates V9 and V12 is turned on to transfer charge packets from color B line 5 ($B_5$) and color A line 6 ($A_6$). The $A_6$ and $B_5$ charge packets are transferred two lines using 6-phase CCD clocking. Next the color B line 3 ($B_3$) is transferred from the photodiode to VCCD under gate V5 and color A line 4 ($A_4$) is transferred from the photodiode to VCCD under gate V8. The summed charge packets $A_4+A_6$ and $B_3+B_5$ are transferred two lines in the VCCD with 6-phase clocking. The final two rows of charge are transferred from the photodiodes to the VCCD under gates V1 and V4. The $A_2$ and $B_1$ charge packets are added to the $A_4+A_6$ and $B_3+B_5$ charge packets already in the VCCD.

Thus far the present invention discloses how to sum together two lines or three lines of charge packets to increase the frame rate by a factor of two or three. Even if an image sensor with 1440 lines is reduced in resolution to 480 lines by summing three line pairs it will still take longer than 1/30 sec to read out an image. The solution to faster image read out is to also sum together charge packets in the HCCD.

Figure 1:
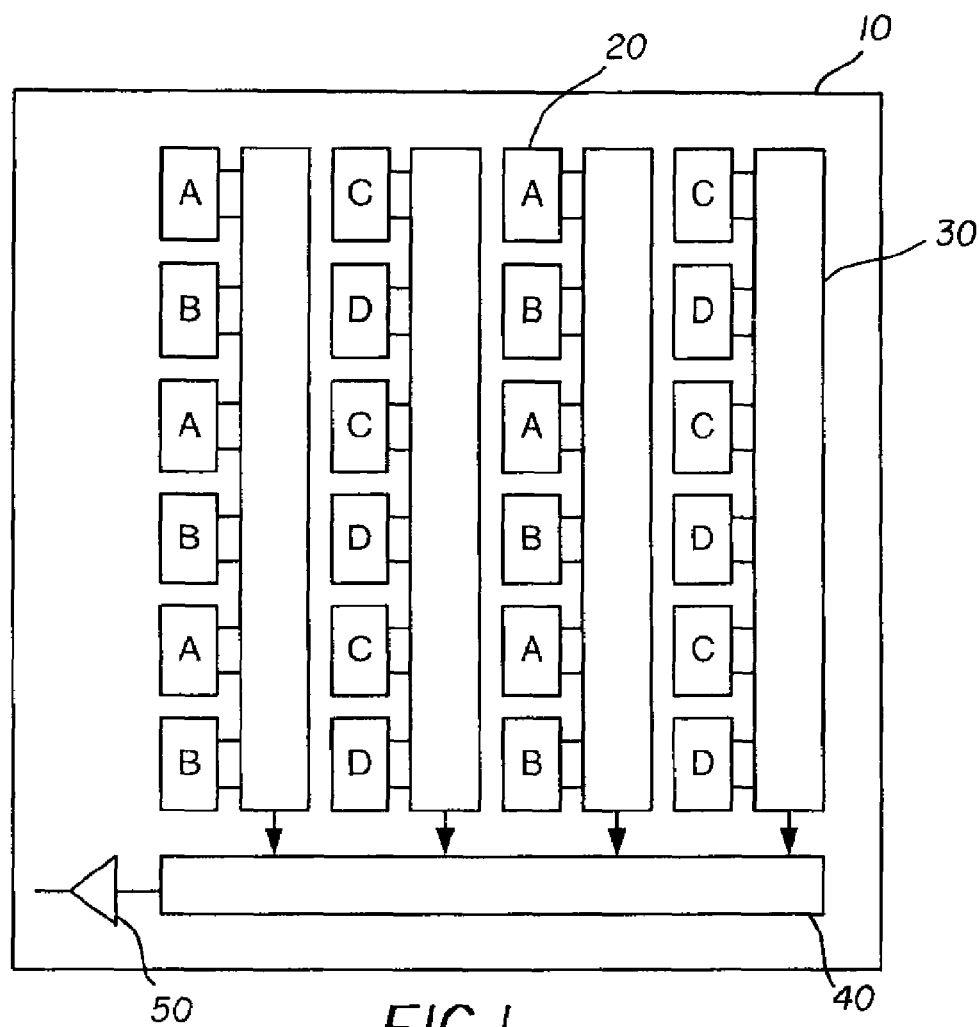
FIG. 1 is a prior art image sensor.
Figure 14:
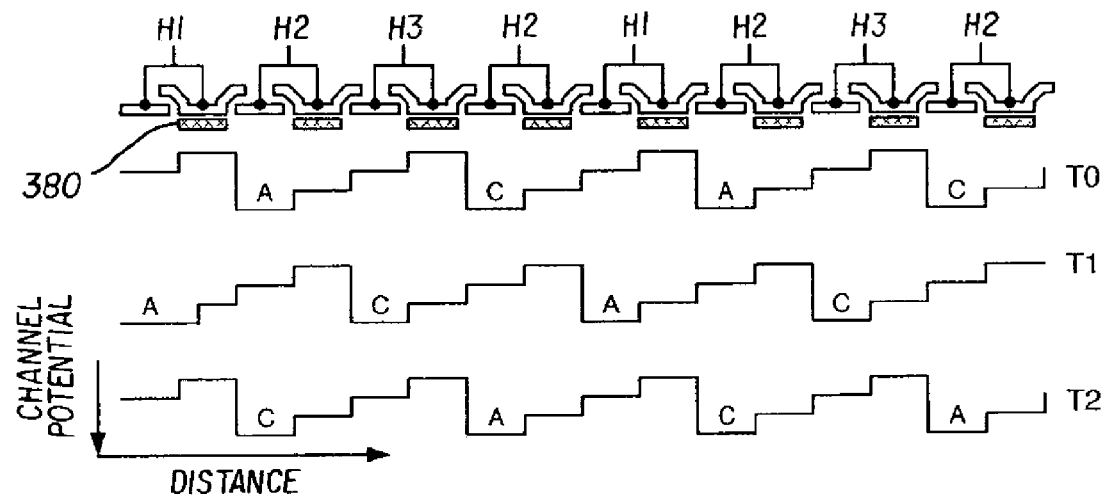
FIG. 14 is a side view of a prior art image sensor including the flow of charge in the channel.
Figure 15:
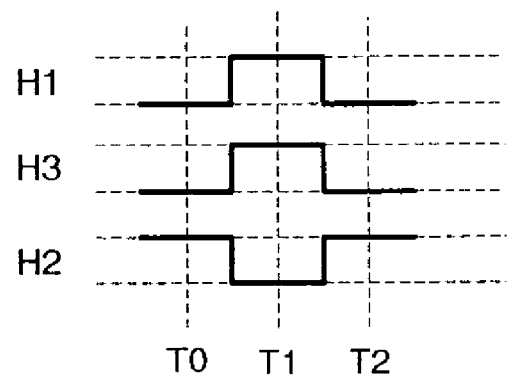
FIG. 15 is a prior art timing diagram for FIG. 14.

Referring to FIG. 14, there is shown a well-known prior art HCCD. It is a pseudo-two phase CCD employing four control gates per column. Each pair of two gates H1, H2 and H3 are wired together with a channel potential implant adjustment 380 under one of the two gates. The channel potential implant adjustment 380 controls the direction of charge transfer in the HCCD. Charge is transferred from the VCCD one line at a time under the H2 gates of the HCCD. FIG. 14 shows the presence of charge packets from the line containing colors A and C from FIG. 1. The charge packets are advanced serially one row through the HCCD at time steps T0, T1, and T2, by applying the clock signals of FIG. 15.

Figure 2:
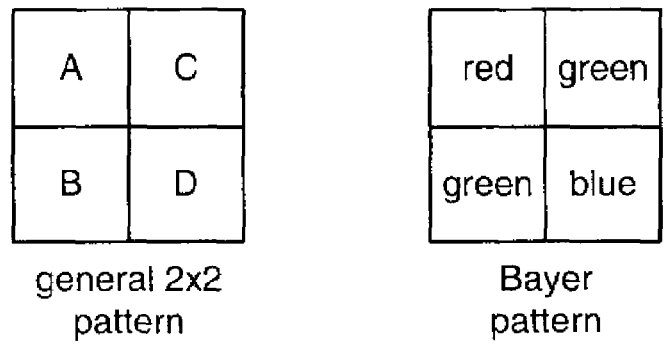
FIG. 2 is a typical prior art color filter array for image sensors.
Figure 16:
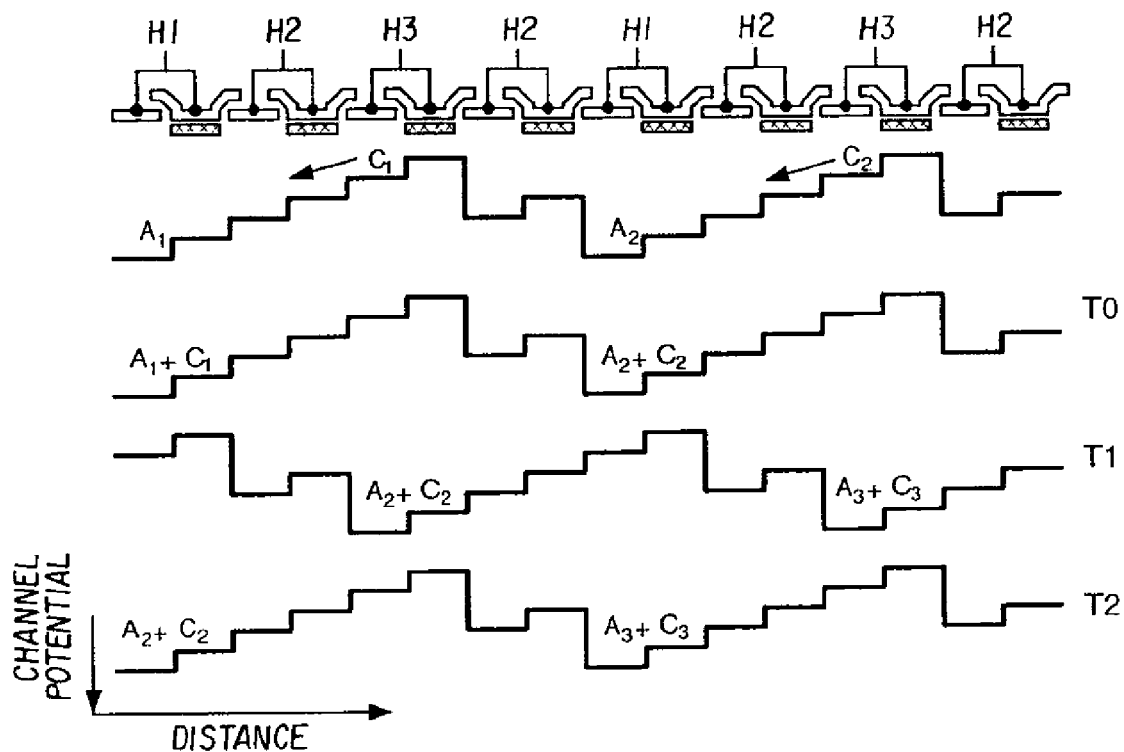
FIG. 16 is a side view of a prior art image sensor including the flow of charge in the channel.
Figure 17:
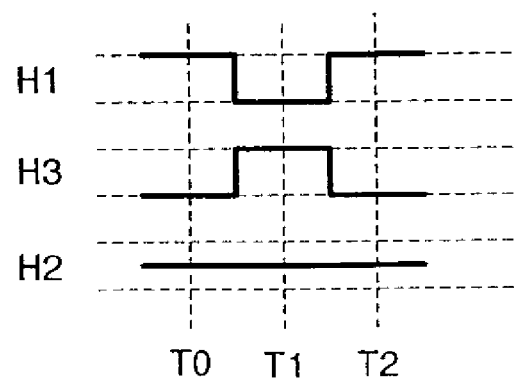
FIG. 17 is a prior art timing diagram of FIG. 16.

U.S. Pat. No. 6,462,779 provides a method of summing two pixels in the HCCD to reduced the total number of HCCD clock cycles in half. This is shown in FIG. 16. This method is designed for linear image sensors where all pixels are of one color. In a two dimensional array employing the 2×2 color pattern of FIG. 2, each line has more than one color. Thus, in FIG. 16 when a line containing colors A and C is transferred into the HCCD and clocked with the timing of FIG. 17 the colors A and C are added together. That destroys the color information and the image.

Figure 18:
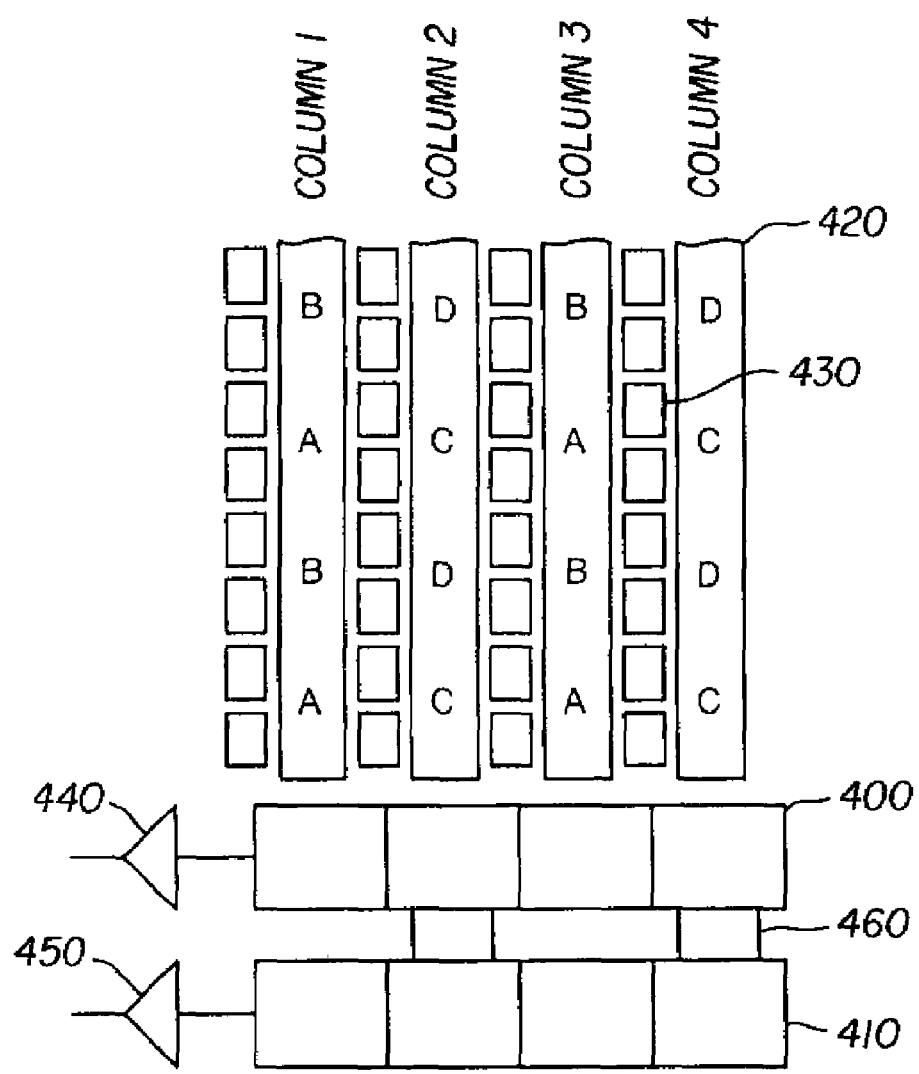
FIG. 18 is the image sensor of the present invention including the VCCDs and HCCDs.

The present invention shown in FIG. 18 provides a method to prevent the mixing of colors when summing pixels in the HCCD. The invention consists of an array of photodiodes 430 covered by a 2×2 color filter pattern of four colors A, B, C, and D. Charge packets from the photodiodes 430 are transferred and summed vertically in the VCCD 420 using the two or three line summing described earlier. The two line summing is depicted in FIG. 18. There is a first HCCD 400 and a second HCCD 410 located at the bottom of the pixel array. There is a transfer channel 460 every other column for the purpose of transferring half of the charge packets from the first HCCD 400 to the second HCCD 410. There is an output amplifier 440 and 450 at the end of each HCCD for converting the charge packets to a voltage for further processing.

Figure 19A:
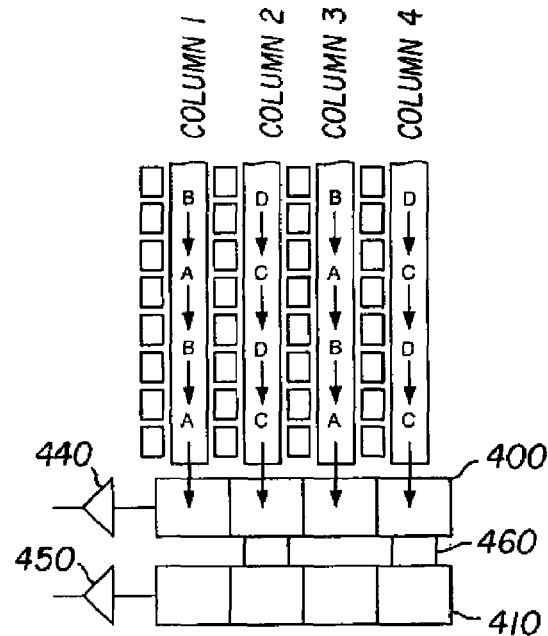
FIGS. 19a-19d are diagrams of the image sensor of the present invention illustrating the clocking of charge in the VCCDs and HCCDs.
Figure 19B:
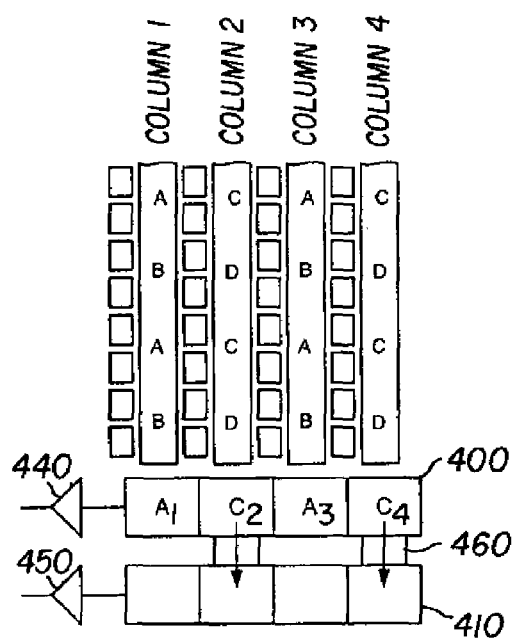
Figure 19C:
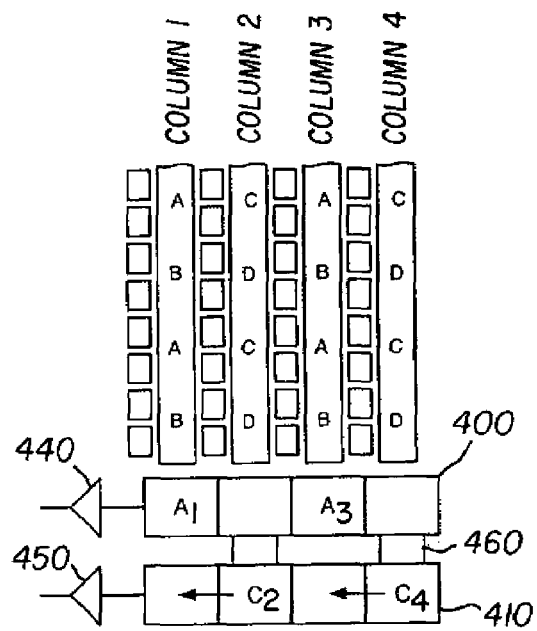
Figure 19D:
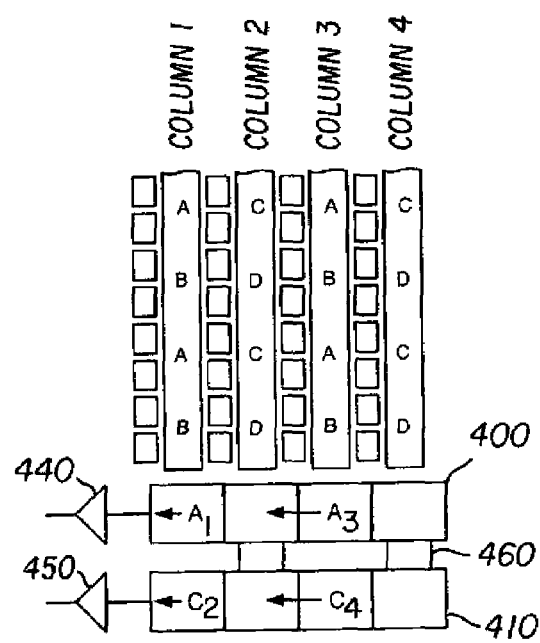

FIGS. 19a-19d shows the charge transfer sequence for reading out one line through the HCCD. First in FIG. 19a, one line containing colors A and C is transferred into the first HCCD 400 as shown in FIG. 19b. Charge packets are labeled with a letter corresponding to the color and a subscript corresponding to the column from which the charge packet originated. In FIG. 19c, the charge packets from the even numbered columns only pass through the transfer gate 460 and into the second HCCD 410. In FIG. 19d, the charge packets in the second HCCD 410 are advanced by one column to align them with the charge packets in the first HCCD 400. The number of clock cycles needed to read out each HCCD is equal to one half the number of columns in the HCCD. The addition of a second HCCD 410 reduces the read out time by half. Most importantly, each HCCD now contains only one color type.

Figure 20A:
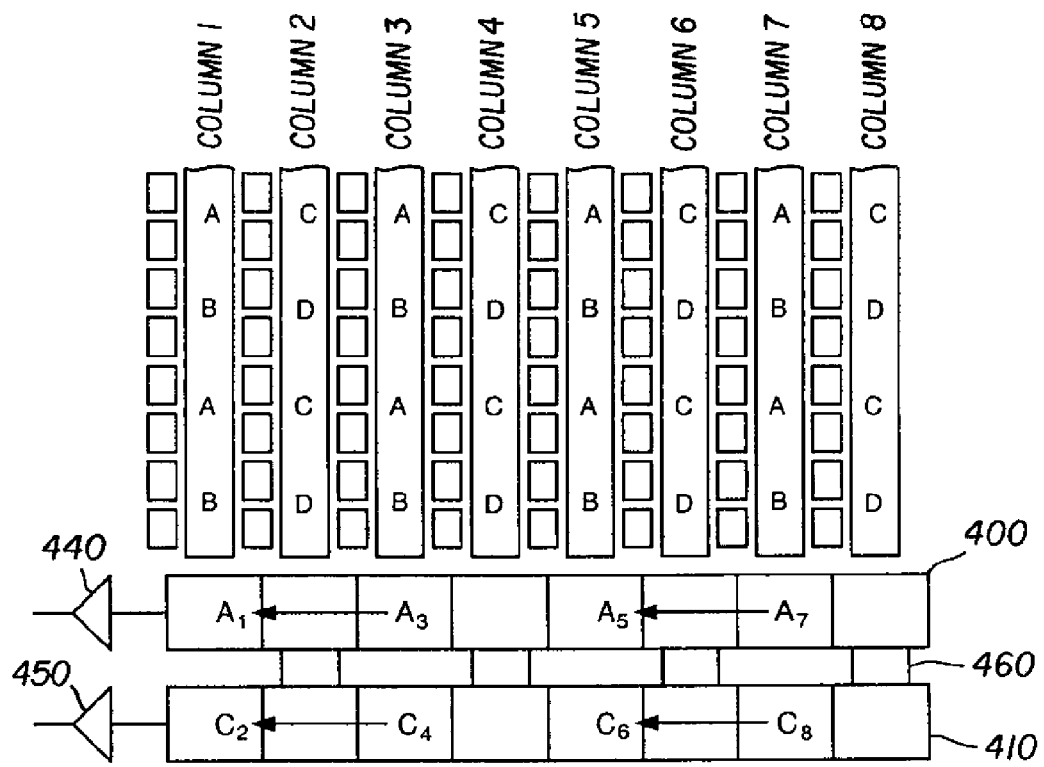
FIGS. 20a-20b are diagrams of the image sensor of the present invention illustrating the clocking of charge in the HCCDs.
Figure 20B:
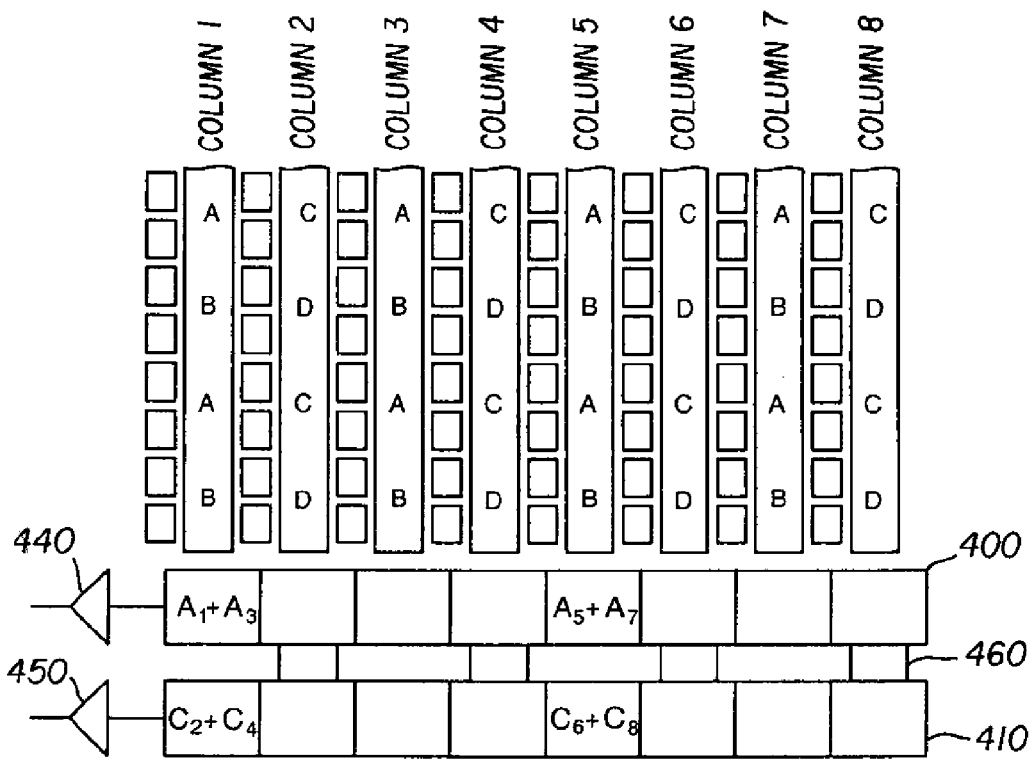

Two charge packets may be summed together horizontally in each HCCD 400 and 410 as shown in FIGS. 20a and 20b. The summing is done without mixing charge packets of different colors. The two pixel summing reduces the number of charge packets to read out of each HCCD 400 and 410 by another factor of two. This HCCD design provides a total speed improvement of a factor of four. Combined with the two line or three line summing described earlier allows an eight or twelve fold increase in frame rate for a video mode. That is enough to allow sampling of all pixels in an 11 million-pixel image sensor at a frame rate of 30 frames/second.

Figure 21:
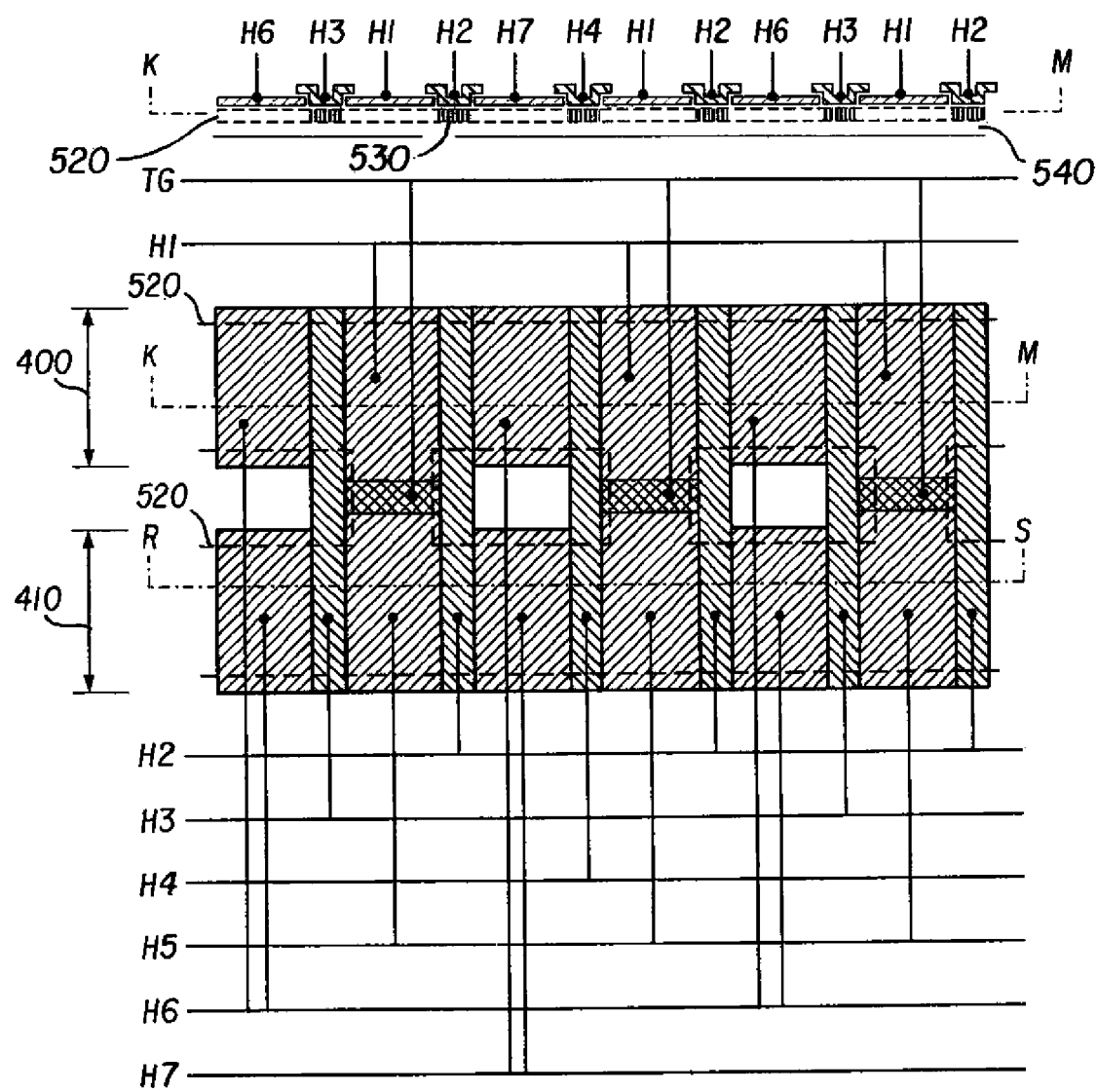
FIG. 21 is a detailed view of the HCCDs.

FIG. 21 shows the HCCD structure in greater detail. There is the first HCCD 400 and second HCCD 410 fabricated on top of an n-type buried channel CCD 520 in a p-type well or substrate 540. The buried channel CCD 520 has channel potential implant adjustments 530 for pseudo-2-phase clocking. The top portion of FIG. 21 shows the side view cross section K-M through the first HCCD 400. There are seven wires, which supply the control voltages to the HCCD gates H1 through H7. An additional wire TG controls the transfer gate between the two HCCDs 400 and 410. The gate electrodes are typically, but not required to be, poly-silicon material of at least two levels. A third level of poly-silicon may be used for the transfer gate if the manufacturing process used does not allow the first or second levels of poly-silicon to be used. With careful use of implants in the buried channel of the transfer gate region and slightly modified gate voltages the transfer gate can be omitted entirely. The exact structure of the transfer gate is not important to the function of the invention.

Figure 22:
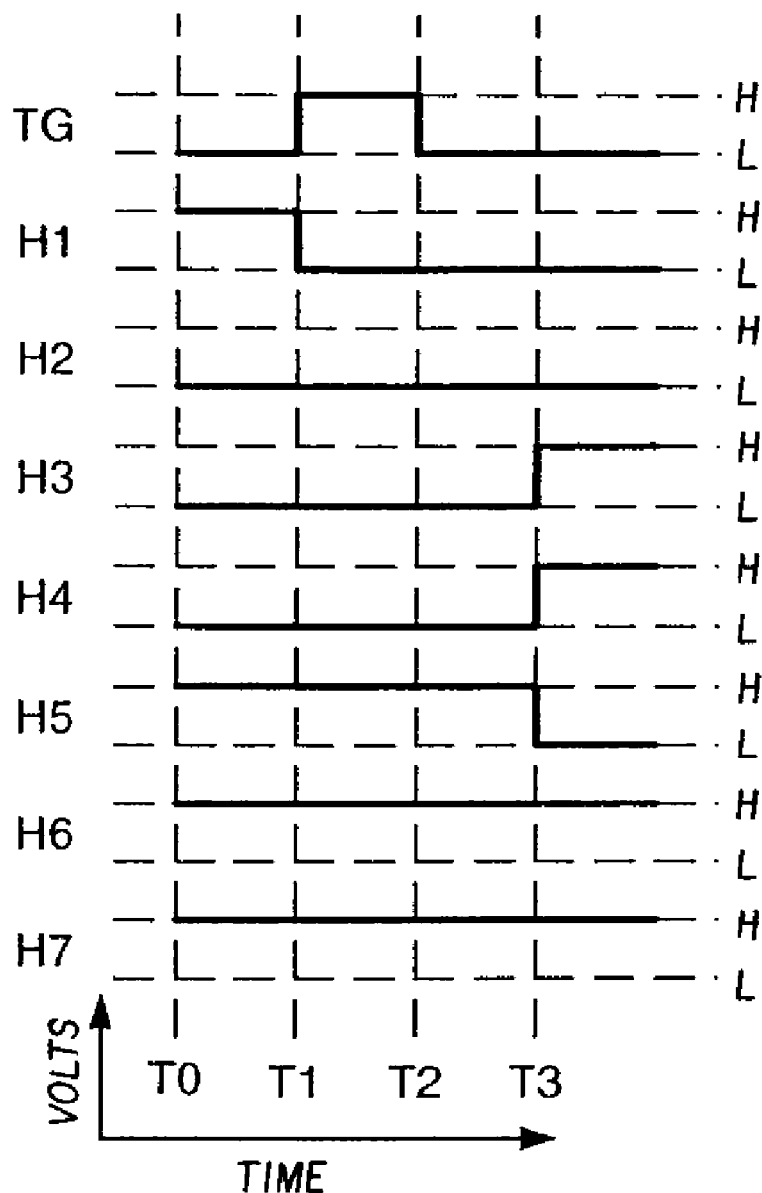
FIG. 22 is a timing diagram of FIG. 21.

The clock voltages applied to the HCCD of FIG. 21 are shown in FIG. 22 for transfer of charge from the first HCCD to the second HCCD. At time T0 of FIG. 22, the H1, H6 and H7 gates are switched high to receive charge from the first HCCD 400. The H2, H3, and H4 barrier gates are held low to prevent the mixing of charge packets in the first HCCD 400. At time T1 the transfer gate TG is turned on and H1 is clocked low to transfer only the charge packets under the H1 gate from the first HCCD 400 to the second HCCD 410. TG is turned off at time T2. Finally at time T3, the second HCCD clocks are switched to advance the charge packets in the second HCCD 410 so the charge packets are held under the same gate as the first HCCD 400 charge packets.

Figure 23A:
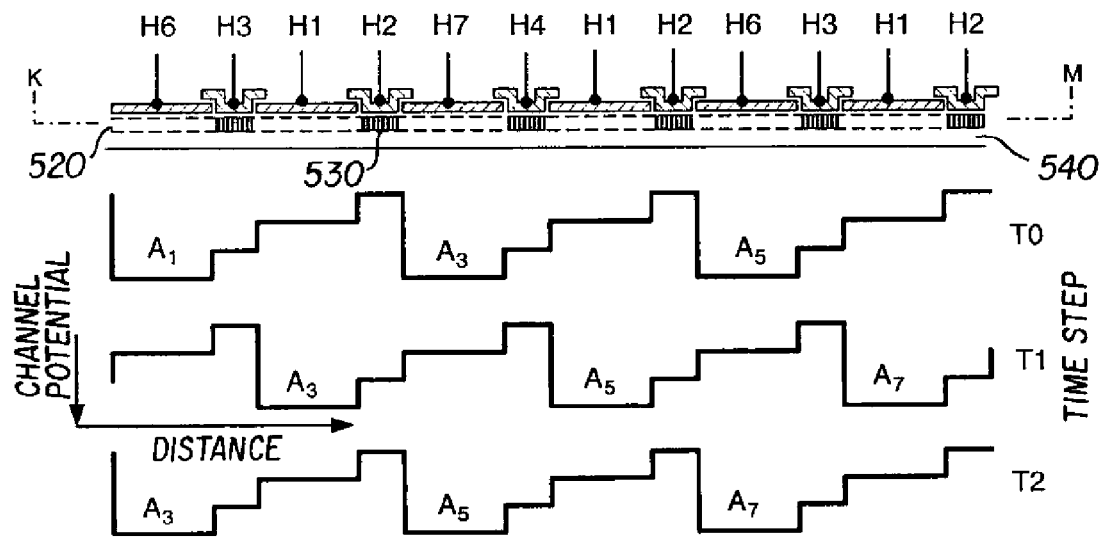
FIGS. 23a and 23b are side views of the image sensor of FIG. 22 illustrating the clocking of charge in the HCCDs in full resolution mode.
Figure 23B:
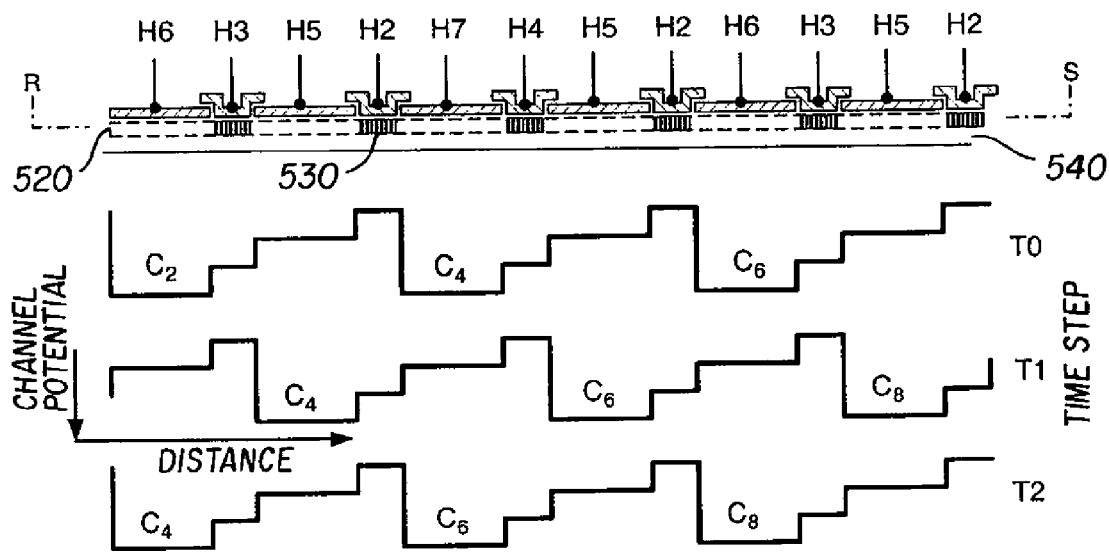
Figure 24:
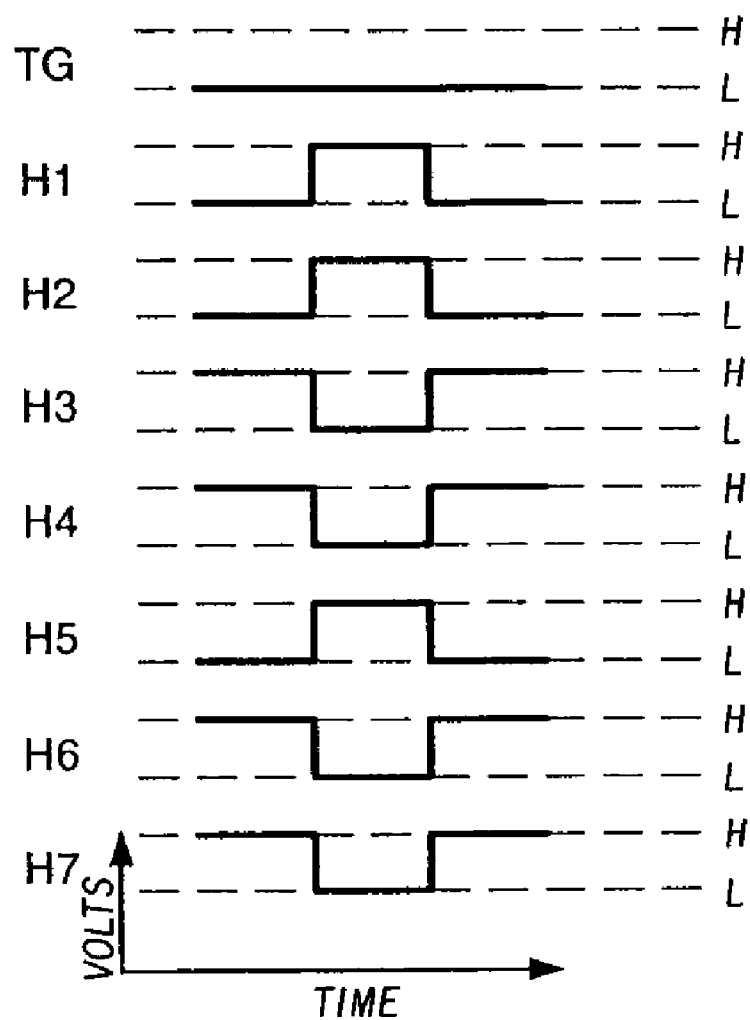
FIG. 24 is a timing diagram of FIGS. 23a and 23b.

The following discusses the readout of the HCCD in full resolution mode for still photography. FIG. 23a shows the charge transfer sequence for the first HCCD and FIG. 23b shows the charge transfer sequence for the second HCCD. A letter corresponding to the color of the charge packet, A, B, C, or D, identifies the charge packets. The subscript on the charge packet label corresponds to the column number of the charge packet. The clock voltages for each time step are shown in FIG. 24. The HCCD is clocked as a pseudo 2-phase CCD between two voltages H and L. The transfer gate TG is held in the off state (L) to prevent mixing of charge between the two HCCDs.

Figure 25A:
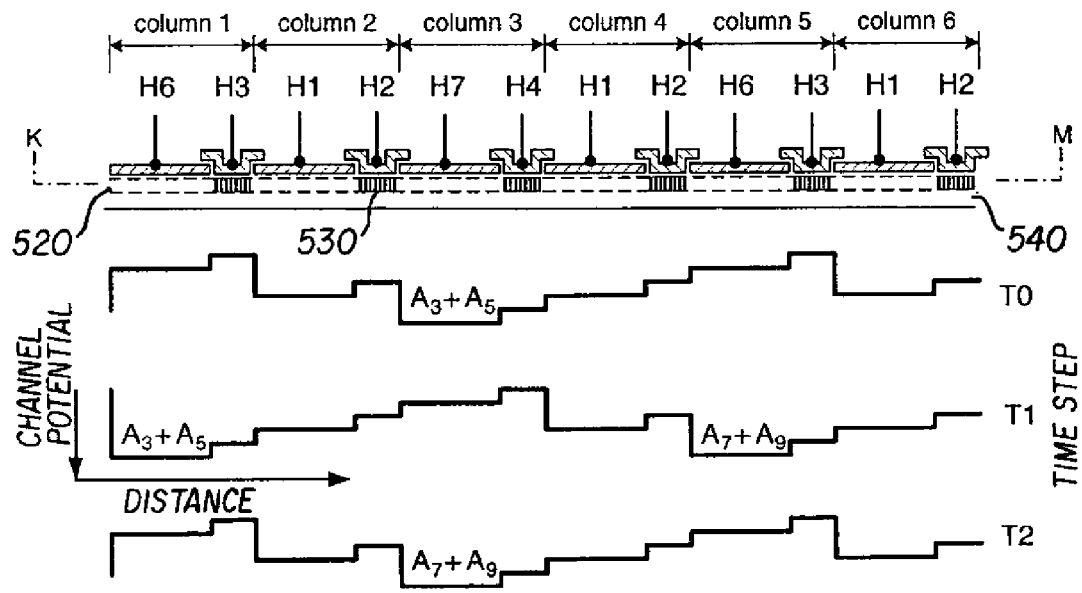
FIGS. 25a and 25b are side views of the image sensor of the present invention illustrating the clocking of charge.
Figure 25B:
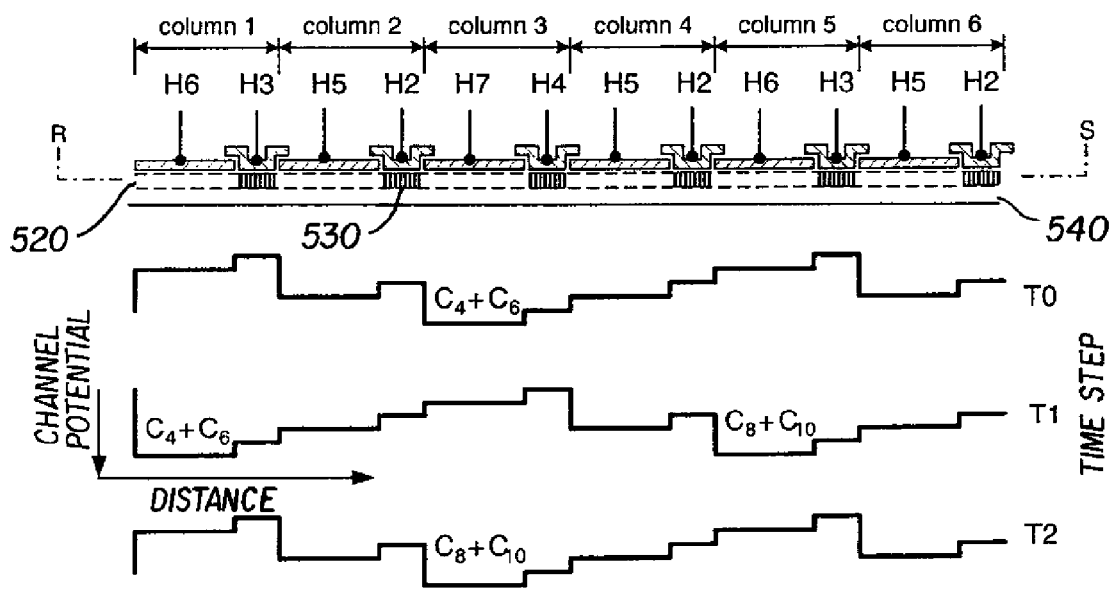
Figure 26:
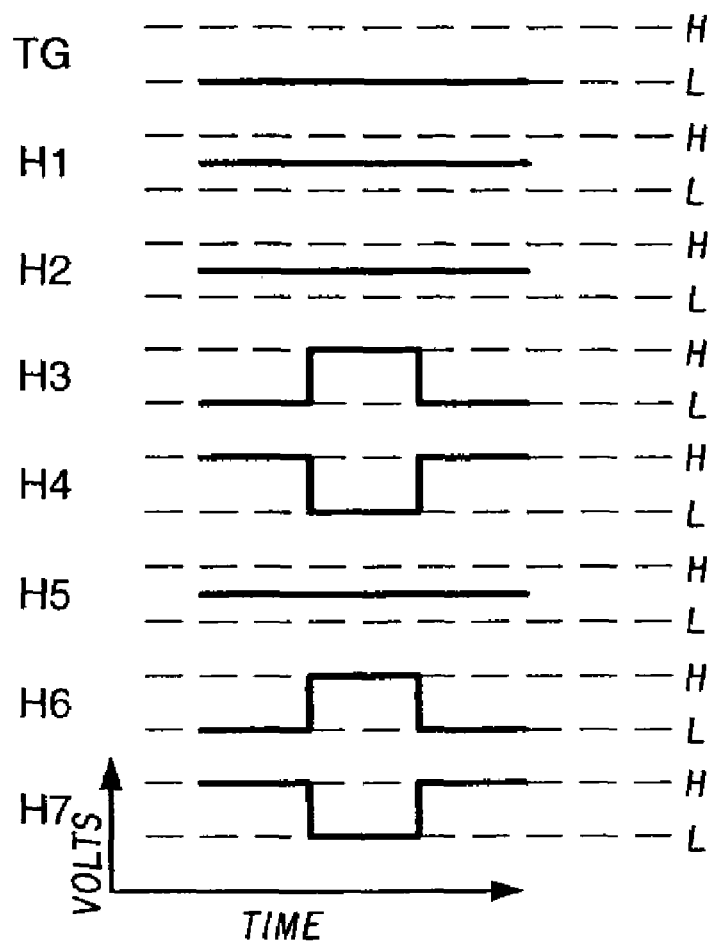
FIG. 26 is a timing diagram for FIGS. 25a and 25b.

In video mode, two charge packets are summed together as shown in FIG. 25a for the first HCCD and FIG. 25b for the second HCCD. Notice that the first HCCD only contains charge packets from pixels of color A and the second HCCD only contains charge packets from pixels of color C. FIG. 26 shows the gate voltage clocking sequence. Gates H1, H2, and H5 are held constant at a voltage approximately halfway between H and L. The voltages H and L in video mode do not have to be equal to the voltages used for full resolution still photography. Only gates H3, H4, H6 and H7 are clocked in a complimentary manner. As can be seen in FIGS. 25a and 25b one clock cycle advances the charge packets by four columns in the HCCD. This is what provides the factor of four-speed increase in video mode.

Due to the large number of photodiode charges being summed together there is the possibility of too much charge in the VCCD or HCCD causing blooming. The VCCD and HCCD can easily be overfilled. It is widely known that the amount of charge in a vertical overflow drain type photodiode is regulated by a voltage applied to the image sensor substrate. This voltage is simply adjusted to reduce the photodiode charge capacity to a level to prevent overfilling the VCCD or HCCD. This is the exact same procedure normally used even without summing together pixels.

Figure 27:
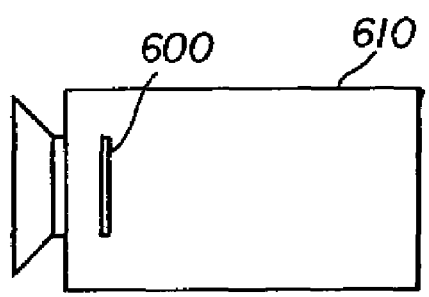
FIG. 27 is a camera illustrating a typical commercial embodiment for the image sensor of the present invention.

FIG. 27 shows an electronic camera 610 containing the image sensor 600 capable of video and high-resolution still photography as described earlier. In video mode 100 percent of all pixels are sampled.

The VCCD charge capacity is controlled by the amplitude of the VCCD gate clock voltages. Since the invention sums charges in the HCCD the VCCD does not have to contain full charge packets in order to produce a full signal at the output amplifiers. If the HCCD will sum together two charge packets then VCCD charge capacity can be reduced by a factor of two by lowering the amplitude of the VCCD clock voltages. The advantage of lowing the VCCD clock voltages is reduced power consumption in video mode. The power consumption varies as the voltage squared. Thus a camera would increase the VCCD clock voltages if the camera is operating in still photography mode, or decrease the VCCD clock voltages if the camera is operating in video mode.

The invention has been described with reference to a preferred embodiment. However, it will be appreciated that variations and modifications can be effected by a person of ordinary skill in the art without departing from the scope of the invention.

PARTS LIST

10 Image Sensor (CCD)
20 Photodiodes
30 Vertical CCD (VCCD)
40 Horizontal CCD (HCCD)
50 Output Amplifier
100 Image Sensor
120 Photodiodes
130 Vertical CCD (VCCD)
132 Control Gate Electrodes
134 Control Gate Electrodes
380 Channel Potential Implant Adjustment
400 First Horizontal CCD (HCCD)
410 Second Horizontal CCD (HCCD)
420 Vertical CCD (VCCD)
430 Photodiodes
440 Output Amplifier
450 Output Amplifier
460 Transfer Channel
520 n-type Buried Channel CCD
530 Channel Potential Implant Adjustment
540 p-type Well or Substrate
600 Image Sensor
610 Electronic Camera

The invention claimed is:

1. A method for reading out one line of charge containing two colors to a first and second horizontal shift registers connected in parallel, the method comprising the step of:
(a) transferring charge containing two colors from a plurality of vertical CCDs to the first horizontal shift register;
(b) transferring charge of one particular color from the first register to the second shift register; and
(c) transferring charge within both the first and second horizontal shift registers so that two charges of the same color in the one line of charge are respectively summed in the first and second horizontal shift registers for reducing readout time.

2. A camera for reading out one line of charge containing two colors to a first and second horizontal shift registers connected in parallel comprising:
(a) means for transferring charge containing two colors from a plurality of vertical CCDs to the first horizontal shift register;
(b) means for transferring charge of one particular color from the first register to the second shift register; and
(c) means for transferring charge within both the first and second horizontal shift registers so that two charges of the same color in the one line of charge are respectively summed in the first and second horizontal shift registers for reducing readout time.

* * * * *